United States Patent [19]
Sun et al.

[11] Patent Number: 6,071,489
[45] Date of Patent: Jun. 6, 2000

[54] METHODS OF PREPARING CATHODE ACTIVE MATERIALS FOR LITHIUM SECONDARY BATTERY

[75] Inventors: Yang-Kook Sun; Young-Roak Kim, both of Daejeon; Kyu-Sung Kim, Kyungsangnam-do; Dong-Won Kim, Daejeon, all of Rep. of Korea

[73] Assignee: Samsung Display Device Co., Ltd., Suwon-shi, Rep. of Korea

[21] Appl. No.: 08/982,384

[22] Filed: Dec. 2, 1997

[30] Foreign Application Priority Data

| Dec. 5, 1996 | [KR] | Rep. of Korea | 96-61907 |
| Apr. 25, 1997 | [KR] | Rep. of Korea | 97-15553 |
| Apr. 25, 1997 | [KR] | Rep. of Korea | 97-15555 |
| Jun. 23, 1997 | [KR] | Rep. of Korea | 97-26485 |
| Oct. 7, 1997 | [KR] | Rep. of Korea | 97-51402 |

[51] Int. Cl.$^7$ .................................................. C01G 39/00
[52] U.S. Cl. ................. 423/594; 423/599; 423/605; 423/641; 429/212; 429/218; 429/220; 429/224
[58] Field of Search ............................. 423/605, 641, 423/594, 599; 429/212, 224, 231.1, 218, 220

[56] References Cited

U.S. PATENT DOCUMENTS

| 5,238,673 | 8/1993 | Bruno et al. ............................. 423/598 |
| 5,435,874 | 7/1995 | Takeuchi et al. |
| 5,474,752 | 12/1995 | Yamamoto |
| 5,571,640 | 11/1996 | Takeuchi et al. |
| 5,591,542 | 1/1997 | Sakamoto et al. ........................ 429/192 |
| 5,595,837 | 1/1997 | Olsen et al. .............................. 429/194 |
| 5,686,203 | 11/1997 | Idota et al. ............................... 429/194 |
| 5,707,763 | 1/1998 | Shimizu et al. .......................... 429/217 |
| 5,707,764 | 1/1998 | Miyamoto et al. ....................... 429/223 |
| 5,742,070 | 4/1998 | Hayashi et al. ......................... 252/182.1 |
| 5,770,018 | 6/1998 | Saidi ..................................... 204/157.15 |
| 5,807,646 | 9/1998 | Iwata et al. .............................. 429/224 |
| 5,824,285 | 10/1998 | Koksbang ................................ 423/599 |

*Primary Examiner*—Tom Dunn
*Assistant Examiner*—Cam N. Nguyen
*Attorney, Agent, or Firm*—Staas & Halsey, LLP

[57] ABSTRACT

The $Li_xMn_2O_4$ powder for cathode active material of a lithium secondary battery of the present invention is prepared by a method of comprising the steps of mixing an acetate aqueous solution using Li acetate and Mn acetate as metal precursors, and a chelating agent aqueous solution using PVB, GA, PAA or GC as a chelating agent; heating the mixed solution at 70~90° C. to form a sol; further heating the sol at 70~90° C. to form a gel precursor; calcining the produced gel precursor at 200~900° C. for 5~30 hours under atmosphere. The cathode active material, $Li_xMn_2O_4$ powder for a lithium secondary battery in accordance with the present invention has a uniform particle size distribution, a high crystallinity and a pure spinel-phase, and a particle size, a specific surface area, a lattice of a cubic structure and the like can be controlled upon the preparing conditions. The present invention also provides a method of preparing $LiNi_{1-x}Co_xO_2$ powder, which comprises the steps of providing a gel precursor using PAA as a chelating agent and hydroxide, nitrate or acetate of Li, Co and Ni as metal precursors; heating the gel precursor at 200~900° C. for 5~30 hours to form a powder. The $Li_xMn_2O_4$ and $LiNi_{1-x}Co_xO_2$ powder of the present invention can be used for a cathode active material of a lithium secondary battery such as a lithium ion battery or lithium polymer battery.

11 Claims, 22 Drawing Sheets

2θ / degree

METHODS OF PREPARING CATHODE ACTIVE MATERIALS FOR LITHIUM SECONDARY BATTERY

FIELD OF THE INVENTION

The present invention relates to methods of preparing $Li_xMn_2O_4$ and $LiNi_{1-x}Co_xO_2$ powder, which are cathode active materials, for lithium secondary battery. More particularly, the present invention relates to a method of preparing cathode active materials for lithium secondary battery, such as $Li_xMn_2O_4$, which are prepared from Li-salt and Mn-salt as metal precursors, and polyvinyl butyral (hereinafter "PVB"), glycolic acid (hereinafter "GA"), polyacrylic acid (hereinafter "PAA") or glycine (hereinafter "GC") as a chelating agent, and to a method of preparing cathode active materials for lithium secondary battery, such as $LiNi_{1-x}Co_xO_2$, which are prepared from Li-salt, Ni-salt and Co-salt as metal precursors, and polyacrylic acid as a chelating agent.

BACKGROUND OF THE INVENTION

Lithium secondary batteries are of interest for use in portable electronic sources, which are superior to the prior art secondary batteries in energy density, high operating voltage, no memory effect, etc. A cathode of a lithium secondary battery has a lower capacity compared to an anode thereof. For example, the theoretical capacity of the anode is 372 mAh/g($Li_1C_6$ reference), whereas that of the cathode is 148~274 mAh/g that is much lower than the theoretical capacity of the anode. A substantial capacity of the cathode is 110~200 mAh/g. Therefore, a new cathode material which has a high capacity has been needed. It is known that a transition metal oxide such as $Li_xCoO_2$, $LiNiO_2$ and $Li_xMn_2O_4$ and an oxide solid solution such as $LiM_xCo_{1-x}O_2$ and $LiM_xCo_{1-x}O_2$(M=Ni, Co, Fe, Mn, Cr, etc) are currently used. Recently, the $LiCoO_2$ amongst said cathode active materials is widely used. However, the price of $LiCoO_2$ is expensive (about twice of Li and fifty times of Mn) and harmful to human being, so that an alternative cathode material is required. Many researchers have been studying the $Li_xMn_2O_4$ among said cathode materials, due to the lowest price, easiness of manufacturing, safety of electrolyte, safety of use, and harmlessness of human being. Recently, a lithium ion battery made of $Li_xMn_2O_4$ is marketed by Japan Moli Energy Company.

The most general method for preparation of $Li_xMn_2O_4$ is a solid phase reaction method. This method carries out several cycles in the process of mixing and calcining of powder of the raw materials, which are carbonate salt and hydroxide of each component. There are disadvantages of said method that a large amount of impurities from the ball mill are allowed in the mixing step. It is difficult to obtain a homogeneous phase and to control the particle size of the powder uniformly. Further this method is carried out at the high temperature, and the preparation time is long.

In the field of ceramic manufacturing, a sol-gel method is under developing. This method comprises dissolving metal alkoxide in solvent, making a sol by hydrolysis and polymerization, making a gel by controlling temperature, concentration and the other conditions, and then obtaining a powder of ceramic through drying. However, in case of using metal alkoxide as a metal precursor, it is not good for economic reasons due to the high price thereof. Accordingly, the Pechini method using citric acid and ethylene glycol have been studied recently. The properties of a cathode active material depend on a kind of a chelating agent. Therefore, an appropriate selection of a chelating agent is required.

There are advantages of using a sol-gel method that it is easy to control a composition ratio, that it is possible to obtain a product having a high homogeneity through the process of a sol-gel, that the impurities from the manufacturing process is not allowed to mix, that it is possible to fabricate the cathode material at a low temperature of calcining in a short time, and that it is possible to fabricate into various shapes such as a sphere shape, a membrane shape, a fiber, etc.

The conventional cathode active materials for a lithium secondary battery such as $Li_xMn_2O_4$ have a poor crystallinity, homogeneity and morphology. In order to obtain good properties of a cathode material of a lithium secondary battery, the $Li_xMn_2O_4$ should have a high crystallinity and a high homogeneity, and have a homogeneous powder shape having a narrow particle distribution. The reason is based on the fact that while charge/discharge occurs continuously, the change of volume of $Li_xMn_2O_4$ is occurred.

The present inventors have developed a sol-gel method using acetate, nitrate and/or hydroxo-salt as metal precursors and PVB, GA, PAA or GC as a chelating agent. This method can prepare $Li_xMn_2O_4$ powder having a uniform particle size, and also control a particle size, a specific surface area and a lattice constant of a cubic structure. The present inventors have also developed a method for preparing $LiNi_{1-x}Co_xO_2$ powder using PAA as a chelating agent, and Li, Co and Ni nitrates as metal precursors.

OBJECTS OF THE INVENTION

An object of this invention is to provide a method of preparing $Li_xMn_2O_4$ and $LiNi_{1-x}Co_xO_2$ powder using PVB, GA, PAA or GC as a chelating agent, and Li acetate and Mn acetate as metal precursors.

Another object of the invention is to provide a method of preparing $Li_xMn_2O_4$ and $LiNi_{1-x}Co_xO_2$ powder having a little of cation-mixing.

A further object of the invention is to provide a method of preparing $Li_xMn_2O_4$ and $LiNi_{1-x}Co_xO_2$ powder having a phase-pure.

A further object of the invention is to provide a good cathode active material for a lithium secondary battery, which is prepared by a sol-gel method using PVB, GA, PAA or GC as a chelating agent.

A further object of the invention is to provide $Li_xMn_2O_4$ and $LiNi_{1-x}Co_xO_2$ powder having a high crystallinity for use in a cathode active material for a lithium secondary battery.

A further object of the invention is to provide $Li_xMn_2O_4$ and $LiNi_{1-x}Co_xO_2$ powder having a high homogeneity for use in a cathode active material for a lithium secondary battery.

A further object of the invention is to provide $Li_xMn_2O_4$ and $LiNi_{1-x}Co_xO_2$ powder having a narrow particle distribution for use in a cathode active material for a lithium secondary battery.

A further object of the invention is to provide a method of preparing $Li_xMn_2O_4$ and $LiNi_{1-x}Co_xO_2$ powder, which can control a particle size, a specific surface area and a lattice constant of cubic structure thereof.

Other objects and advantages of this invention will be apparent from the ensuing disclosure and appended claims.

SUMMARY OF THE INVENTION

The $Li_xMn_2O_4$ powder, cathode active material, for a lithium secondary battery of the present invention is prepared by a method comprising the steps of mixing an acetate aqueous solution using Li acetate and Mn acetate as metal precursors, and a chelating agent aqueous solution using PVB, GA, PAA or GC as a chelating agent; heating the mixed solution at 70~90° C. to form a sol; heating the sol at 70~90° C. to form a gel precursor; and calcining the produced gel precursor at 200~900° C. for 5~30 hours under atmosphere.

The part of the acetates using as a metal precursor can be substituted for nitrates or hydroxides of the metals.

It is preferable that a molar ratio of Li to Mn for preparing $Li_xMn_2O_4$ (x=1~1.1) is in the range of 1~1.1:2, and a molar ratio of the chelating agent (PVB, GA, PAA or GC) to the total metal ions is in the range of 0.1~5.0.

The cathode active material, $Li_xMn_2O_4$ powder, for a lithium secondary battery in accordance with the present invention has an uniform particle size distribution, a high crystallinity and a pure spinel-phase. The particle size, specific surface area, lattice of a cubic structure and the like can be controlled upon the preparing conditions. The present invention also provides a method of preparing $LiNi_{1-x}Co_xO_2$ powder, which comprises the steps of providing a gel precursor using PAA as a chelating agent and hydroxide, nitrate or acetate of Li, Co and Ni as metal precursors; heating the gel precursor at 200~900° C. for 5~30 hours to form a powder.

A preferable molar ratio of Li, Co and Ni nitrates is 1:0.5:0.5. The $Li_xMn_2O_4$ and $LiNi_{1-x}Co_xO_2$ powder of the present invention can be used for a cathode active material of a lithium secondary battery such as a lithium ion battery or a lithium polymer battery. The present invention can manufacture a thin film for the cathode active material from the state of a sol or a gel using a solution of $Li_xMn_2O_4$ and $LiNi_{1-x}Co_xO_2$.

DETAILED DESCRIPTION OF THE INVENTION

Figure 1:
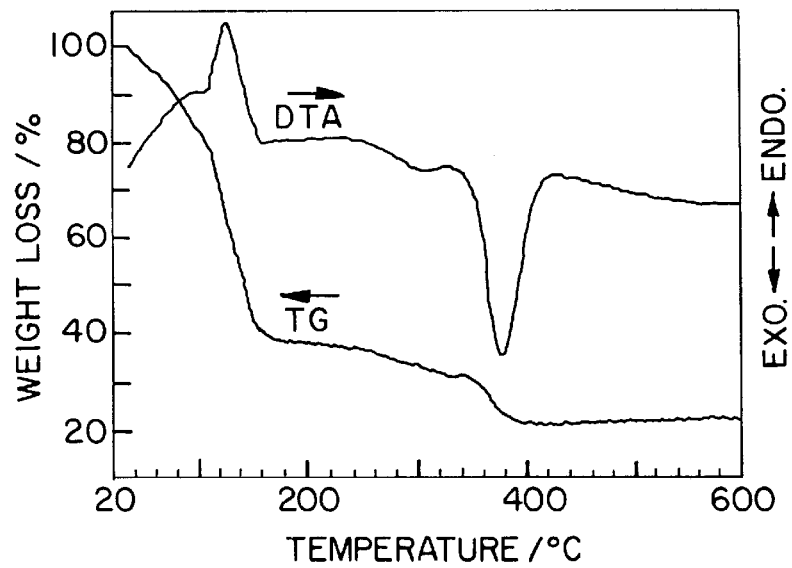
FIG. 1 is a graph of TG-DTA showing the progress from a gel precursor to a ceramic in accordance with Example 1.

The cathode active material, Li$_x$Mn$_2$O$_4$ powder, for a lithium secondary battery according to the present invention is prepared by the steps of mixing an acetate solution using Li acetate and Mn acetate as metal precursors, and a chelating solution using PVB, GA, PAA or GC as a chelating agent; heating the solution in the temperature range of 70 to 90° C. to form a sol; further heating the sol in the temperature range of 70 to 90° C. to form a gel precursor; and calcining the produced gel precursor in the temperature range of 200~900° C. under atmosphere.

An Li acetate used as a metal precursor is Li(CH$_3$COOH).2H$_2$O and a Mn acetate is Mn(CH$_3$COOH)$_2$.4H$_2$O. A part of the acetates can be substituted for a nitrate or hydroxo-salt of the metals. The nitrate can be LiNO$_3$ and Mn(NO$_3$)$_2$.6H$_2$O, and the hydroxo-salt can be γ-MnOOH.

The molar ratio of Li to Mn in the metal precursors is in the range of 1~1.1:2. Namely, the value of x in the Li$_x$Mn$_2$O$_4$ is in the range of 1~1.1.

The metal precursor solution and the chelating solution are mixed as controlling the pH of the mixed solution into 1~11 by adding nitric acid or aqueous ammonia. The mixed solution produces a chelating agent/metal acetate solution.

The produced chelating agent/metal solution is heated at the temperature of 70~90° C. in a desiccator or magnetic stirrer. Thereafter, a chelating agent/metal sol is obtained by heating.

The obtained chelating agent metal sol is continuously heated in the temperature range of 70~90° C. to form a chelating/metal gel precursor. The produced chelating agent/metal gel precursor is calcined in the temperature range of 200~900° C. under atmosphere or inert gas. The gel precursor is calcined for 5~30 hours ordinarily.

It is preferable that the molarity of chelating agent to 1M of metals (Li and Mn) used as metal precursors is in the range of 0.1~5.0M.

The obtained chelating/metal gel precursor in the present invention is transparent, which indicates that the chelating agent/metal gel precursor is homogeneous.

The prepared cathode active material, Li$_x$Mn$_2$O$_4$, of the present invention is used to prepare a composite cathode for a lithium secondary battery.

The preparation of a composite cathode is composed of the steps of dispersing a Teflon binder in water; adding and mixing a cathode active material, Li$_x$Mn$_2$O$_4$ powder, and a conducting material, Ketjen black, EC powder to form a paste; coating the paste onto stainless steel(ex-met); and drying the coated surface in a vacuum to fabricate a composite cathode.

Another cathode active material, LiNi$_{1-x}$Co$_x$O$_2$, is prepared by using PAA as a chelating agent and metal-salts of Li, Ni and Co as metal precursors. The metal-salts can be hydroxo-salt, nitrate and acetate of the metals. A gel precursor for producing LiNi$_{1-x}$Co$_x$O$_2$ is prepared by using the same manner as the preparation of Li$_x$Mn$_2$O$_4$ with the metal-salts and the PAA. Thereafter, the gel precursor is heated in the temperature range of 200~950° C. for 5~30 hours, and then LiNi$_{1-x}$Co$_x$O$_2$ powder is obtained. For preparing LiNi$_{0.5}$Co$_{0.5}$O$_2$, a preferable molar ratio of Li to Ni to Co in the metal salts is 1:0.5:0.5. It is also preferable that the molarity of PAA as a chelating agent to 1M of metals (Li, Ni and Co)used as metal precursors is in the range of 0.1~5.0M.

The present invention may be better understood by reference to the following examples which are intended for purposes of illustration and are not to be construed as in any way limiting the scope of the present invention, which is defined in the claims appended hereto.

EXAMPLES

Example 1

Preparation of Li$_x$Mn$_2$O$_4$ Using PVB as a Chelating Agent (1) Preparation of Li$_x$Mn$_2$O$_4$ powder Li(CH$_3$COOH).2H$_2$O of 107.121 g and Mn(CH$_3$COOH)$_2$.4H$_2$O of 490.18 g was dissolved in ethanol of 1000 g. The molar ratio of Li(CH₃COOH).2H₂O to Mn(CH₃COOH)₂.4H₂O was 1.05:2. And PVB of 418 g was dissolved in ethanol of 1000 g so that the molar ratio of PVB to total metal ions became 1. After mixing said two solutions, the solution was heated at 70–90° C. in a desiccator or magnetic stirrer to form a sol, thereafter, the sol was gradually heated to form a gel precursor. The gel precursors were calcined at 250° C., 300° C., 400° C., 500° C., 650° C., 750° C., and 800° C. for 10 hours under air to form a $LiMn_2O_4$ powder. The results are shown in Table 1.

TABLE 1

| calcination temperature (° C.) | $LiMn_2O_4$ powder (g) |
|---|---|
| 250 | 259.3 |
| 300 | 250.9 |
| 400 | 123.2 |
| 500 | 120.7 |
| 650 | 119.7 |
| 750 | 117.2 |
| 800 | 117.0 |

(2) Analysis of TG-DTA

In order to examine the progress from a gel precursor to a ceramic according to this Example, the thermal behavior was analysed by TG-DTA, which was shown in FIG. 1. The molar ratio of PVB to total metal ions was 1:1 to prepare the gel precursor. The weight loss of the gel precursor was stopped between 40° C. and 160° C., and between 160° C. and 350° C. The weight loss of the gel precursor between 40° C. and 160° C. was caused by evaporation of ethanol in the gel precursor. The DTA curve at 120° C. corresponds to an endothermic peak. The weight loss of the gel precursor between 160° C. and 350° C. was due to water produced by decomposition of nitric acid in the gel precursor and dehydrogenation which was converted to vinyl alcohol unit in PVB into —CH=CH—. The weight loss between 350° C. and 380° C. was caused by decomposition of remaining organic material such as butyl aldehyde and crotonaldehyde. The weight loss in this section was the half of the weight of the gel precursor excluding moisture content, which was consistent with a stoichiometric quantity of nitric acid and PVB. Also, it is believed that the weight loss was due to severe oxidation and decomposition of the remaining organic material at the decomposition of the gel precursor.

(3) X-ray Diffraction Analysis, Specific Surface Area and Lattice Constant [a]

Figure 2:
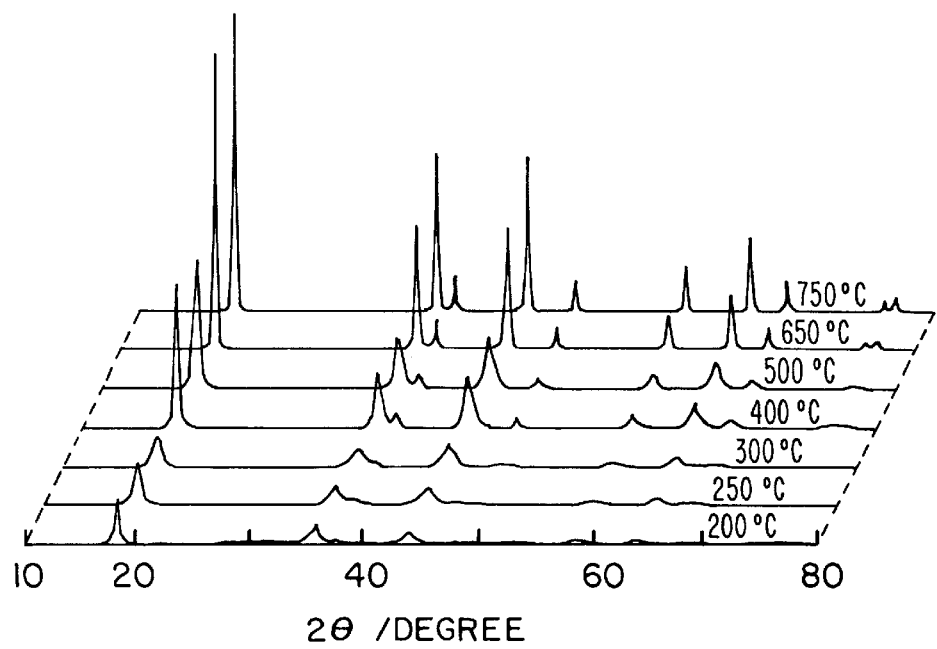
FIG. 2 is a graph of XRD patterns depending upon a calcination temperature of a gel precursor in Example 1.
Figure 3:
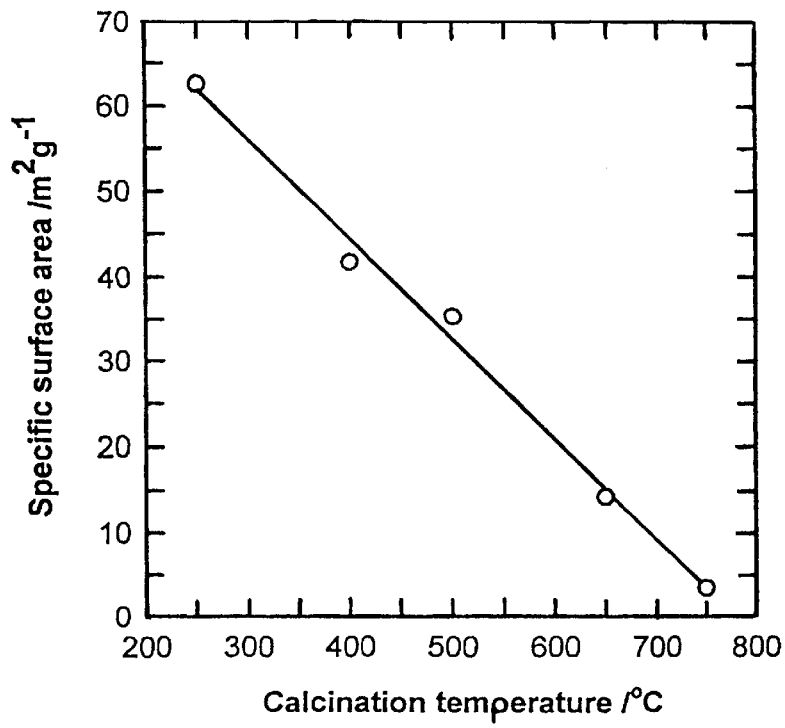
FIG. 3 is a graph showing the relationship between a specific surface area and a calcination temperature of $Li_xMn_2O_4$(x=1~1.1) powder in Example 1.
Figure 4:
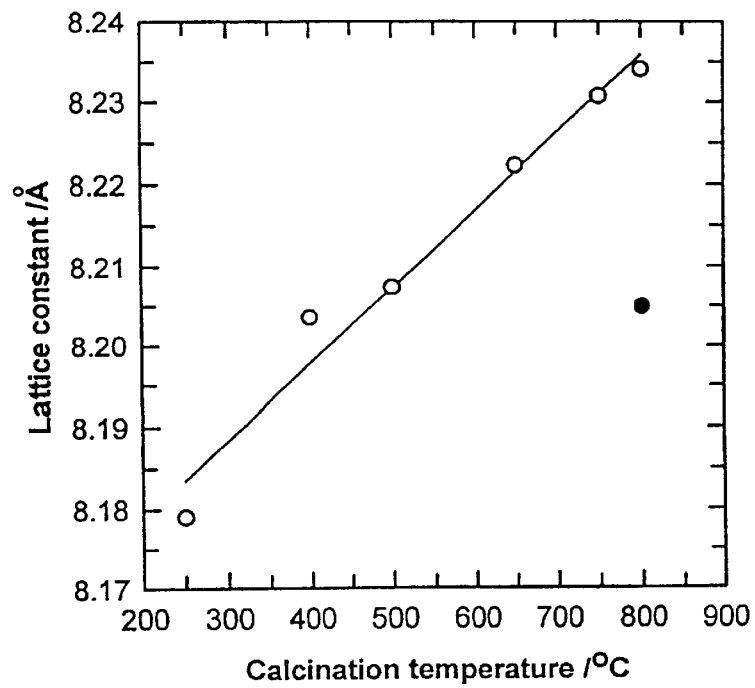
FIG. 4 is a graph showing the relationship between a lattice constant [a], and a calcination temperature of $Li_xMn_2O_4$(x=1~1.1) powder in Example 1.

FIG. 2 illustrates X-ray diffraction patterns of heat-treated samples under air in the temperature range of 200~750° C. for 10 hours, in which the molar ration of PVB to total metal ions was 1:1 to prepare the gel precursor. In case of treating the sample at 250° C., a spinel phase of $LiMn_2O_4$ was obtained. The XRD peak was a sharp and high diffraction peak at a high temperature of calcination, which indicates a high crystallinity of $LiMn_2O_4$. In case of treating the sample at 650° C., the diffraction peak was suddenly increased and a phase having a high crystallinity of $LiMn_2O_4$ was produced. The results show that a sol-gel method according to the present invention needs lower calcination temperature and shorter preparation time than the solid-state method carried out in the range of 650° C.~850° C. for 75~200 hours. The reason is based on the fact that in a sol-gel method using PVB as a chelating agent, the materials were initially mixed homogeneously in atomic size and the particle size was very small. FIG. 3 is a graph showing the relationship between a specific surface area and a calcination temperature of $Li_xMn_2O_4$(x=1~1.1) powder in this Example. The specific surface area depending upon an increase of calcination temperature was decreased linearly due to the growth of crystallinity caused by calcination. The biggest specific surface area of the known $LiMn_2O_4$ is 48 m²/g, which is synthesized by using carbon black or gelatin as a chelating agent at 250° C. The specific surface area of the sample synthesized at 250° C. in the present invention was 63 m²/g, which was the highest value up to now. And also, the specific surface area of the sample calcined at 750° C. was 3.5 m²/g, which was similar to the value of conventional products. FIG. 4 is a graph showing the relationship between a lattice constant [a], and a calcination temperature of a cubic spinel $LiMn_2O_4$ powder (the same sample in FIG. 2). The lattice constant [a] was increased depending upon the calcination temperature, which was due to a decrease of oxidation number of Mn cation.

(4) XRD Pattern

Figure 5:
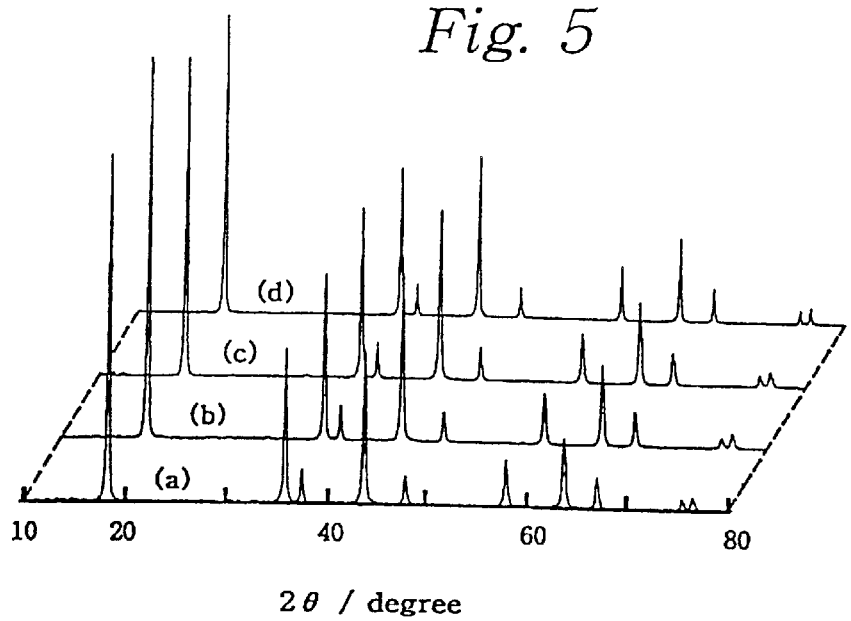
FIG. 5 is a graph of X-ray diffraction patterns of powder prepared by calcining a gel precursor at 750° C. depending upon the molar ratio of PVB (polyvinyl butyral) to total metal ions in Example 1.
Figure 6:
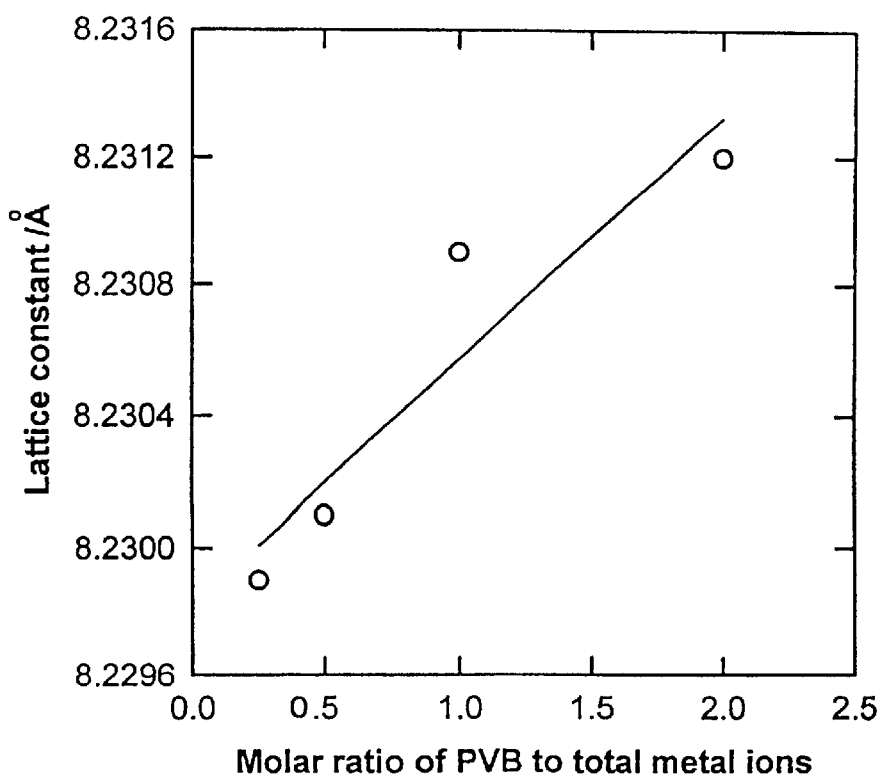
FIG. 6 is a graph showing a lattice constant [a] of powder prepared by calcining a gel precursor at 750° C. depending upon the molar ratio of PVB to total metal ions in Example 1.

XRD patterns of the sample depending upon the molar ratio change of PVB to total metal ions such as 0.25, 1.0, 1.5 and 2.0 were shown in FIG. 5. Each of the gel precursors was calcined at 750° C. for 10 hours under air. It was confirmed that the prepared sample had a cubic spinel structure having a space group of Fd3m regardless the molar ratio change of PAA to total metal ions. The more the molar ratio of PVB to total metal ions was increased, the more a peak size (533 and 622) and a separation rate were increased, which indicates the increase of the crystallinity of the sample. In order to specifically examine the structure change of a spinel $LiMn_2O_4$ depending upon an increase of the amount of PVB, the Rietveld refinement of data obtained in FIG. 5 was carried out. The calculated results are shown in FIG. 6. The lattice constant [a] was linearly increased depending upon the amount of PVB.

(5) Particle Size

The SEM photograph of a powder which was prepared by calcining a gel precursor at 300° C. and 750° C. for 10 hours under air, wherein the molar ratio of PVB to total metal ions was 1.0, was examined. The powder calcined at 300° C. was composed of aggregated homogeneous sphere particles, and the average radius was 30 nm. If the calcination temperature was increased, the growth of crystallinity of the powder would be increased, so that the aggregated particles was grown up on big particle. In case of heat-treating powder at 750° C., the aggregated particles was grown up 0.2 μm of average radius, and the particle distribution was very homogeneous.

(6) Discharge Capacity

The charge/discharge current of 1 mA/cm² was used to examine the 10th voltage curved depending upon discharge capacity and the discharge capacity depending upon the cycle life for Li/$LiMn_2O_4$ and Li/$LiMn_{1.95}Mg_{0.05}O_4$ cell carried out at 40° C. The $LiMn_2O_4$ and $LiMn_{1.95}Mg_{0.05}O_4$ powder were calcined at 800° C. for 10 hours. The two samples showed the two discharge plateaues which were characteristics of Mn-spinel structure. The first and the 10th discharge capacities of Li/$LiMn_2O_4$ cell were 134 mAh/g and 128 mAh/g, respectively. The early discharge capacity of Li/$LiMn_{1.95}O_4$ cell was low, whereas the cycle life was excellent.

$Li_xMn_2O_4$(x=1~1.1) using the prior solid-state reaction method was prepared by reacting a gel precursor in the temperature range of 650° C. to 850° C. over 36 hours, however, a gel precursor in Example 1 was prepared in the temperature range of 250° C. to 900° C. for 10 hours. Also, the specific surface area of a $Li_xMn_2O_4$(x=1~1.1) prepared by a solid-state reaction method or a wet process (sol-gel process) was 3~48 m²/g. However, the specific surface area of the sample prepared according to this Example was in the range of 3.5~63 m$^2$/g and the average particle size was in the range of 30~200 nm, which indicates that the particle size was very homogeneous. Also, the present invention could control the physicochemical properties such as particle size, specific surface area, cubic spinel lattice constant [a] and microcrystalline morphology by changing the calcination temperature and time, and the amount of a chelating agent. The first discharge voltage was similar to the Pechini method, however, the cycle property was excellent.

EXAMPLE 2

Preparation of Li$_x$Mn$_2$O$_4$ Using GA as a Chelating Agent (1) Preparation of Li$_x$Mn$_2$O$_4$ Powder Li(CH$_3$COOH)·2H$_2$O and Mn(CH$_3$COOH)$_2$·4H$_2$O were dissolved in distilled water. The molar ratio of Li(CH$_3$COOH)·2H$_2$O to Mn(CH$_3$COOH)$_2$·4H$_2$O was 1~1.1:2. Thereafter, the aqueous solution which had the molar ratio of 0.5, 1.0, 1.5 and 2.0 of glycolic acid to total metal ions was mixed with the above solution. After mixing said two solutions, the solution was heated in the temperature range of 70~90° C. in a desiccator or magnetic stirrer to form a sol, thereafter, the sol was gradually heated to form a gel precursor. In the present invention, the synthesis of the transparent gel precursor was possible in the all ranges of the molar ratio of glycolic acid to total metal ions. The gel precursor was calcined in the temperature range of 250~900° C. for 5~30 hours under air to form a LiMn$_2$O$_4$ powder.

(2) Analysis and Results of TG

Figure 7:
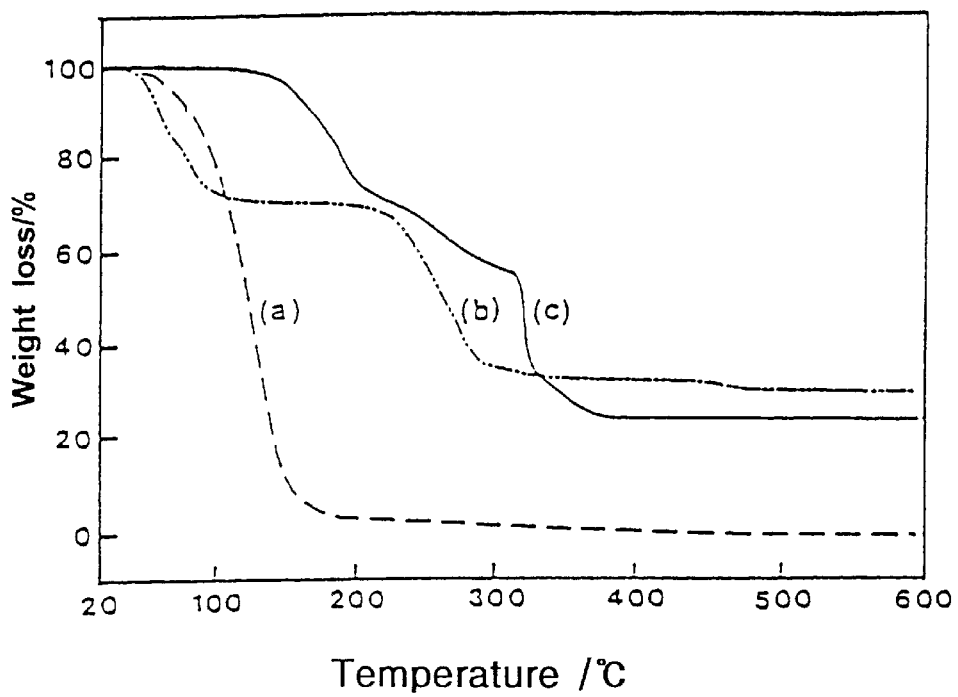
FIG. 7 is a graph of TG showing the progress from a gel precursor to a ceramic in Example 2.

The gel precursor prepared by this Example was transparent, which indicates that the gel precursor was homogeneous. In order to examine the progress from a gel precursor to a ceramic, a gel precursor prepared by using glycolic acid, and Li acetate and Mn acetate (1:2) mixture, which was dried at 80° C. in a vacuum and analyzed by TG. The results are shown in FIG. 7. In FIG. 7, (a) indicates glycolic acid, and (b) indicates acetate salt solution mixed as Li to Mn of 1:2, and (c) indicates a gel precursor. The molar ratio of glycolic acid to total metal ions for preparing a gel precursor was 1.5:1. The weight loss of glycolic acid was stopped at 186° C. The mixture of Li acetate and Mn acetate (1:2) had water evaporation between 23° C. and 114° C., decomposition of acetate was occurred between 200° C. and 313° C., and decomposition of the remaining organic material was occurred between 295° C. and 478° C. The weight loss of the gel precursor occurred in the sections of 100~200° C., 200~313° C., and 313~378° C., and the weight loss was stopped at 378° C. The weight loss between 100° C. and 200° C. was caused by decomposition of glycolic acid in the gel precursor, the weight loss between 200° C. and 313° C. was caused by decomposition of acetate in the gel precursor, which was consistent with the weight loss of metal acetate mixture, and the weight loss between 313° C. and 387° C. was caused by decomposition of the remaining organic material. It is inferred that the results were due to the severe oxidation and decomposition reaction of the remaining organic material. The weight loss of this section was the same as 30% by weight of the gel precursor, and this may illustrate that the weight loss vertically occurred in the results of TGA.

(3) Analysis of XRD Patterns

Figure 8:
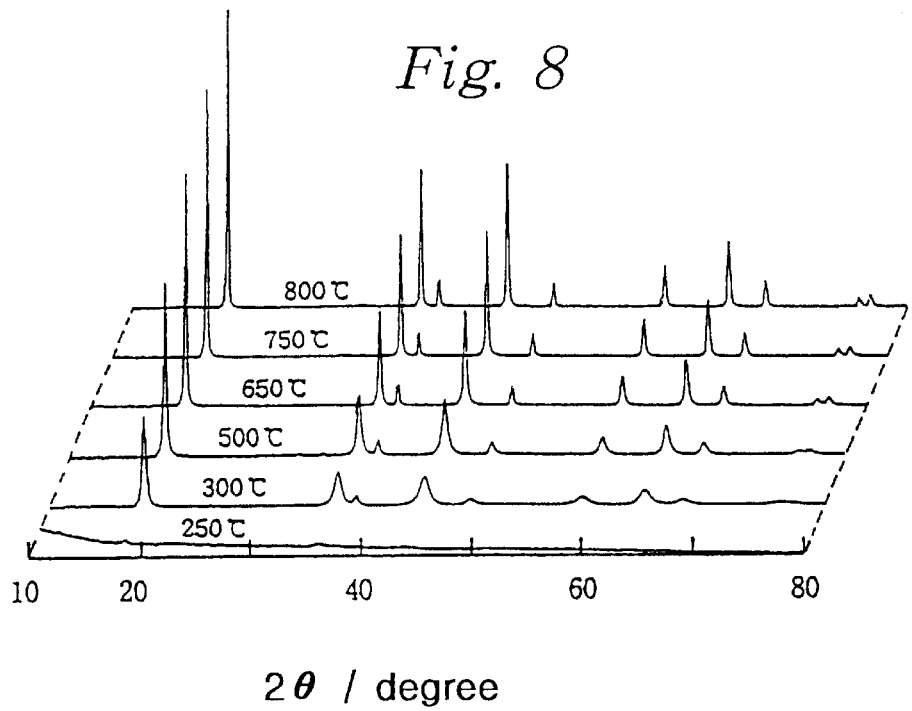
FIG. 8 is a graph of XRD patterns of $Li_{1.03}Mn_2O_4$ powder depending upon a calcination temperature for a gel precursor when the molar ratio of to glycolic acid to total metal ions is 1.5:1 in Example 2.
Figure 9:
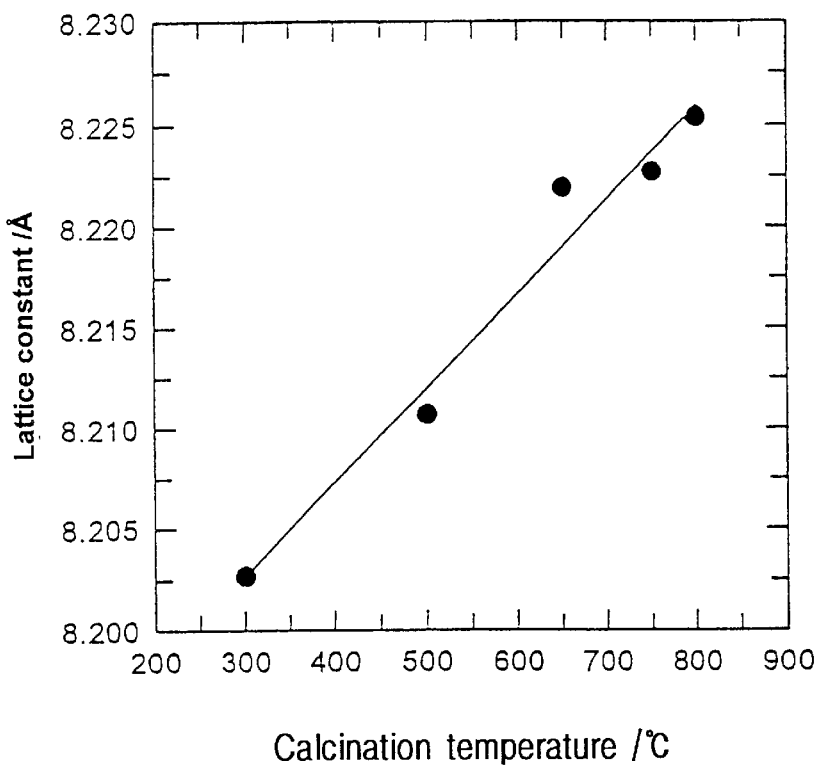
FIG. 9 is a graph showing the relationship between a lattice constant [a] and a calcination temperature for a gel precursor when the molar ratio of to glycolic acid to total metal ions is 1.5:1 in Example 2.

FIG. 8 illustrates X-ray diffraction patterns of heat-treated samples under air in the temperature range of 250° C. to 800° C. for 10 hours, in which the molar ratio of glycolic acid to total metal ions for preparing a gel precursor was 1.5:1. In case of treating the sample at 250° C., a spinel phase of LiMn$_2$O$_4$ which had a low crystallinity was examined. The more the calcination temperature was increased, the more the XRD peak was a sharp and high diffraction peak, which indicates a phase having a high crystallinity of Li$_{1.03}$Mn$_2$O$_4$. The results show that a sol-gel method according to the present invention needs lower calcination temperature and shorter preparation time than the solid-state method carried out in the temperature range of 650° C. to 850° C. for 75~200 hours. The reason is based on the fact that in a sol-gel method using glycolic acid as a chelating agent, the materials were initially mixed homogeneously in atomic size and the particle size was very small. FIG. 9 (the same sample as FIG. 8) illustrates the relationship between the lattice constant [a] of the cubic spinel Li$_{1.03}$Mn$_2$O$_4$ powder and the calcination temperature. The lattice constant [a] was increased depending upon the calcination temperature, which was due to a decrease of oxidation number of Mn cation. In a low temperature, since Mn$^{4+}$ was stable, the lattice [a] was decreased.

Figure 10:
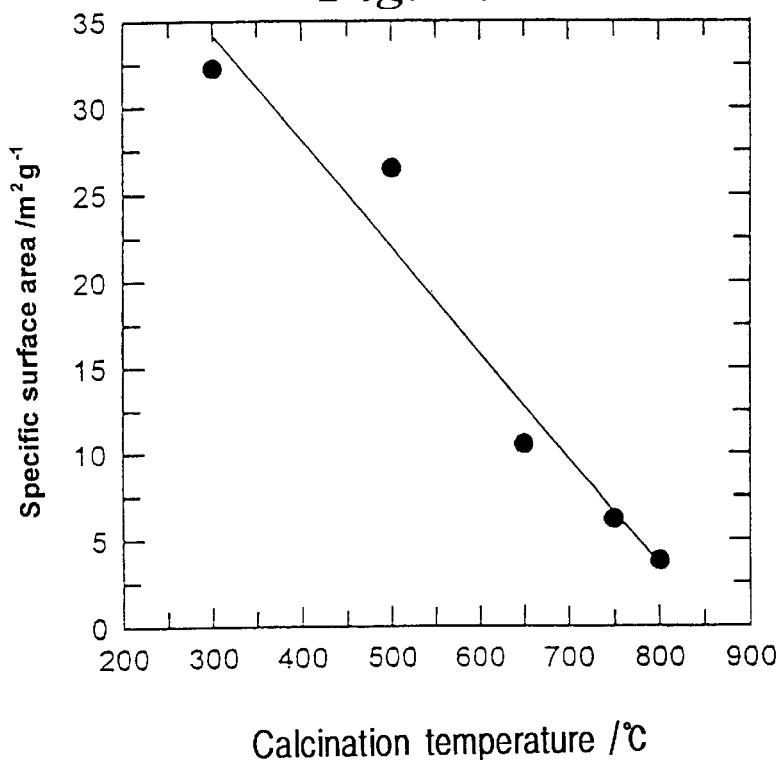
FIG. 10 is a graph showing the relationship between a specific surface area and a calcination temperature for a gel precursor when the molar ratio of to glycolic acid to total metal ions is 1.5:1 in Example 2.

The sample prepared in Example 2 was cooled down with the rate of 30° C./hr, and the lattice constants [a] at 750° C. and 800° C. of the calcination temperature were 8.227 Å and 8.2254 Å, respectively. FIG. 10 illustrates the specific surface area depending upon the calcination temperature of Li$_{1.03}$Mn$_2$O$_4$ powder (the same sample as FIG. 8). As increasing the calcination temperature, the specific surface area of the sample was linearly decreased, which was due to the growth of crystallinity caused by the calcination. The synthesized samples of the present invention at 300° C. and 800° C. had 33 m$^2$/g and 3.8 m$^2$/g, respectively, which were similar to conventional products of Li$_{1.03}$Mn$_2$O$_4$ having 3 m$^2$/g of the specific surface area.

Figure 11:
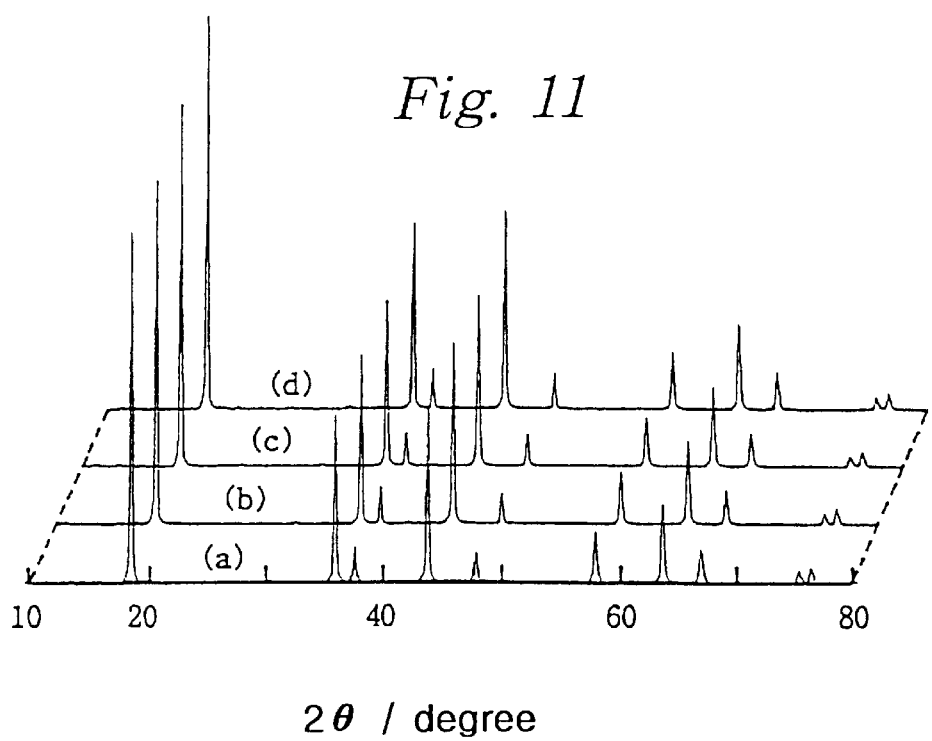
FIG. 11 is a graph of XRD patterns of $Li_{1.03}Mn_2O_4$ powder prepared by calcining a gel precursor at 800° C. when the molar ratios of to glycolic acid to total metal ions are (a) 0.5, (b) 1.0, (c) 1.5 and (d) 2.0 respectively in Example 2.
Figure 12:
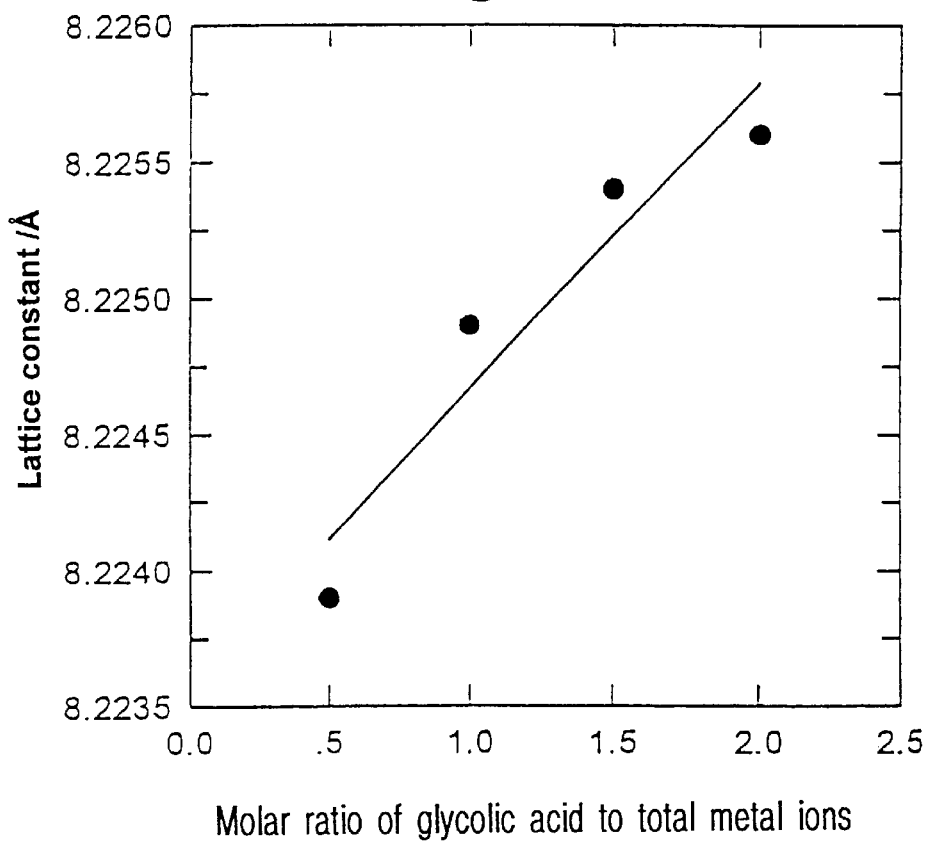
FIG. 12 is a graph showing the relationship between a lattice constant [a] and the molar ratio of total metal ions to glycolic acid for $Li_{1.03}Mn_2O_4$ powder prepared by calcining a gel precursor at 800° C. in Example 2.
Figure 13:
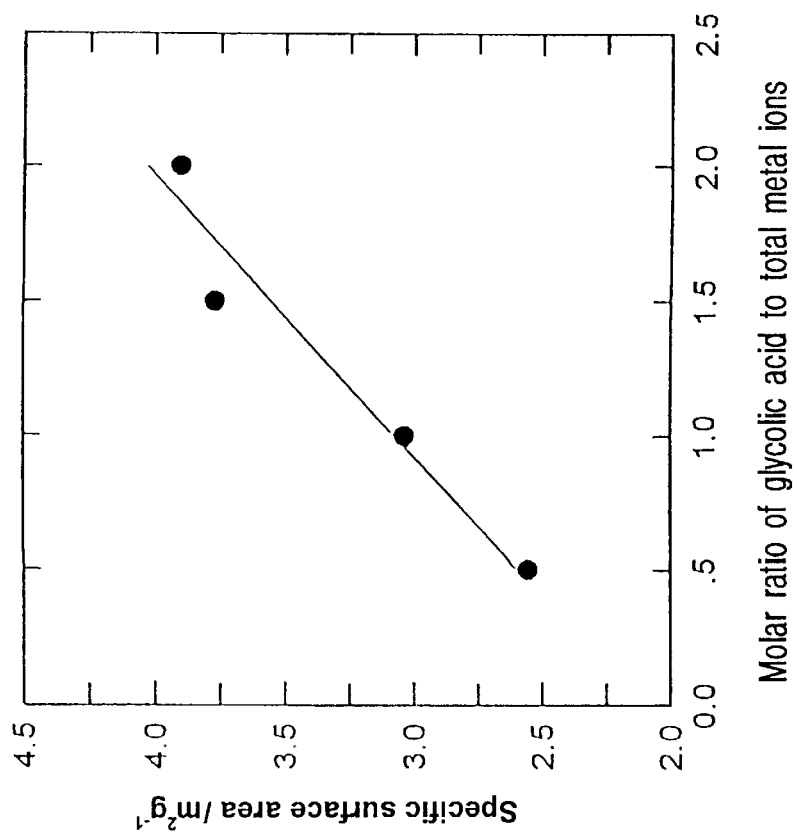
FIG. 13 is a graph showing the relationship between a specific surface area and the molar ratio of to glycolic acid to total metal ions for $Li_{1.03}Mn_2O_4$ powder prepared by calcining a gel precursor at 800° C. in Example 2.

FIG. 11 illustrates XRD patterns of the samples according to the molar ratio change of glycolic acid to total metal ions. The molar ratios of glycolic acid to total metal ions were 0.5, 1.0, 1.5 and 2.0. Each of the gel precursors was calcined at 800° C. for 10 hours under air. It has been confirmed that the prepared samples had a cubic spinel structure having a space group of Fd3m regardless the molar ratio change of glycolic acid to total metal ions. In order to specifically examine the structure change of a spinel Li$_{1.03}$Mn$_2$O$_4$ depending upon an increase of the amount of glycolic acid, the Rietveld refinement of XRD data obtained in FIG. 11 was carried out. The calculated results are presented in FIG. 12, and the lattice constant [a] was linearly increased depending upon an increase of the amount of glycolic acid. FIG. 13 illustrates the specific surface area depending upon the amount of glycolic acid of Li$_{1.03}$Mn$_2$O$_4$ powder. The specific surface area of the sample was linearly increased depending upon the amount of glycolic acid, and when the molar ratios of glycolic acid to total metal ions were 0.5 and 2.0, respectively, the specific surface areas of the samples were 3.9 m$^2$/g and 2.55 m$^2$/g, respectively.

(4) Particle Size

The SEM photograph of a powder which was prepared by calcining a gel precursor at 300° C., 650° C., 750° C. and 850° C. for 10 hours under air, wherein the molar ratio of glycolic acid to total metal ions was 1.5. The powder calcined at 300° C. was composed of aggregated uniform sphere particles, and the average radius was 40 nm. If the calcination temperature was increased, the growth of crystallinity of the powder would be increased so that the aggregated particles was grown up one big particle. In case of heat-treating powder at 800° C., the aggregated particles was grown up 0.3 μm of average radius, and the particle distribution was very homogeneous. The prepared gel precursor with 0.5 and 2.0 of the molar ratio of glycolic acid to total metal ions was calcined at 700° C. for 10 hours. And the SEM photograph of the powder was examined. The particle sizes of the powder prepared with 0.5 and 2.0 of the molar ratio of glycolic acid to total metal ions were 200 nm and 100 nm, respectively. The present invention could control the particle size of the sample as varying the amount of glycolic acid at the same calcination temperature.

(5) Preparation of Cathode Composite

Figure 14:
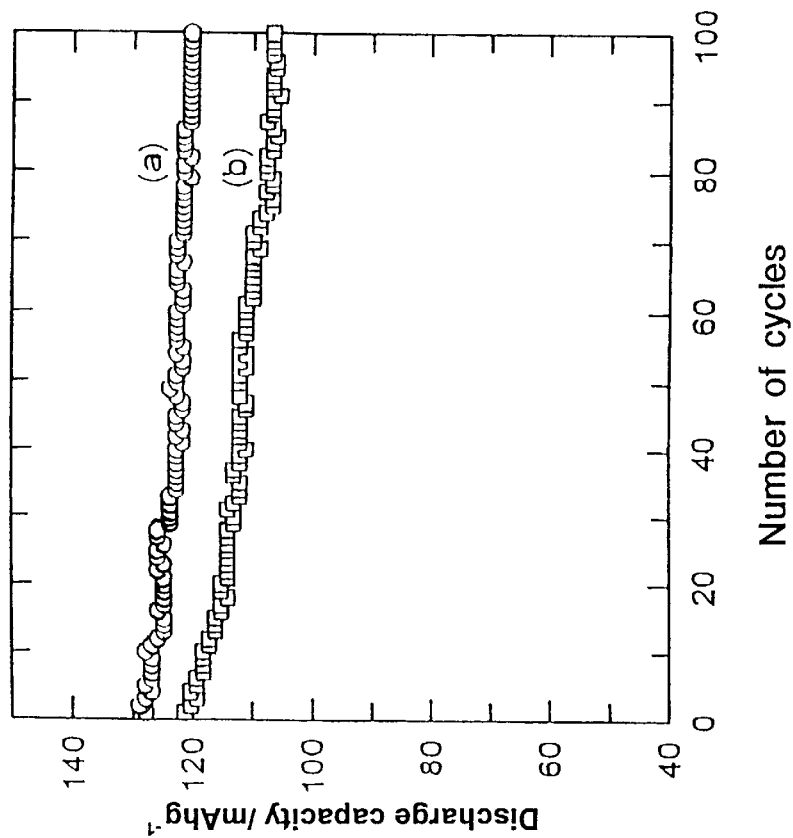
FIG. 14 is a graph showing discharge capacity depending upon the cycle at the voltage limit of 3.4V to 4.3V and at current density of 1 mA/cm$^2$ for Li/1M $LiBF_4$-EC/DEC solution/$Li_{1.03}Mn_2O_4$ battery using $Li_{1.03}Mn_2O_4$ powder prepared by calcining a gel precursor at 760° C. when the molar ratios of to glycolic acid to total metal ions are (a) 1.5 and (b) 0.75 in Example 2.
Figure 15A:
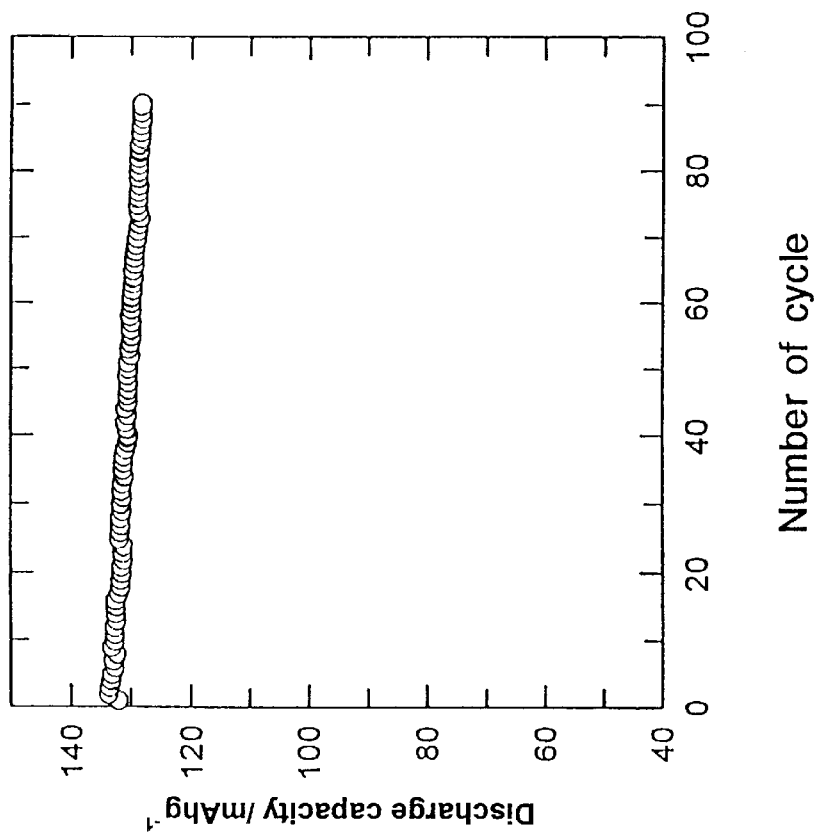
FIG. 15 illustrates (a) charge/discharge graph and (b) discharge capacity graph according to cycle, carried out at the uniform current density of 0.1 mA/cm$^2$ at the voltage limit of 3.4V to 4.3V for Li/polymer electrolyte (PAN) $Li_{1.03}Mn_2O_4$ battery using $Li_{1.03}Mn_2O_4$ powder prepared by calcining a gel precursor at 760° C. in Example 2.
Figure 15B:
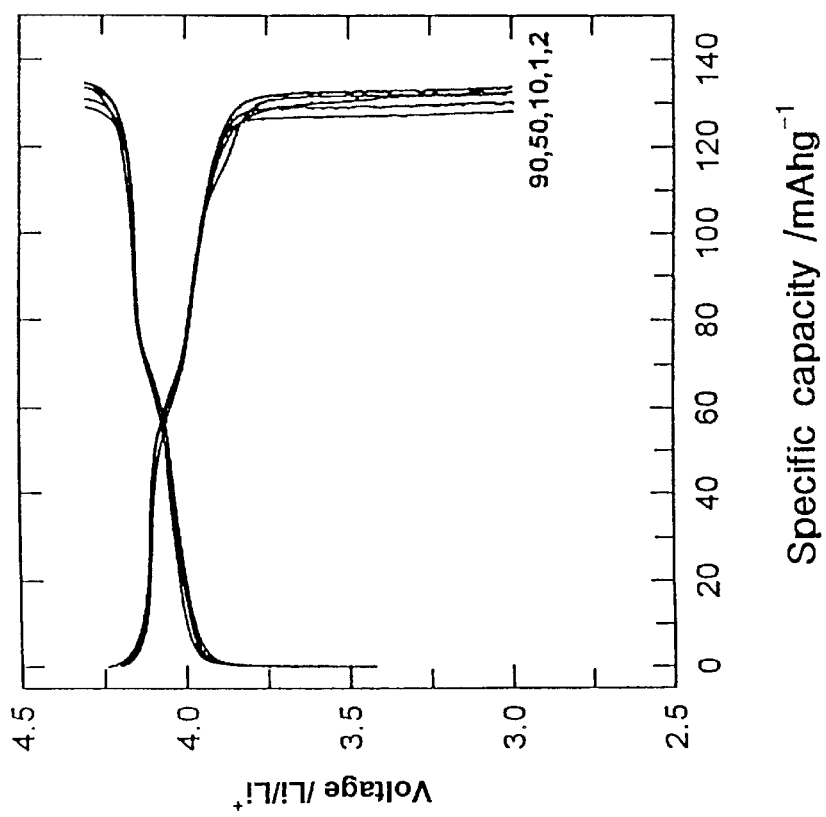
Figure 16:
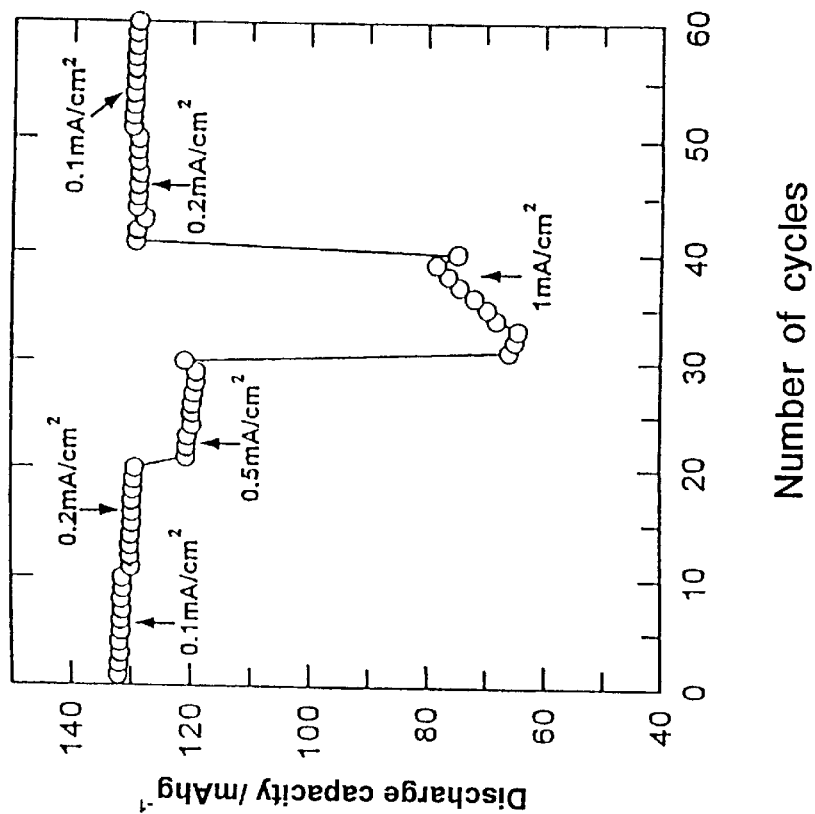
FIG. 16 illustrates a charge-discharge graph of Li/polymer electrolyte(PAN)$Li_{1.03}Mn_2O_4$ battery to various charge/discharge current density in Example 2.
Figure 17:
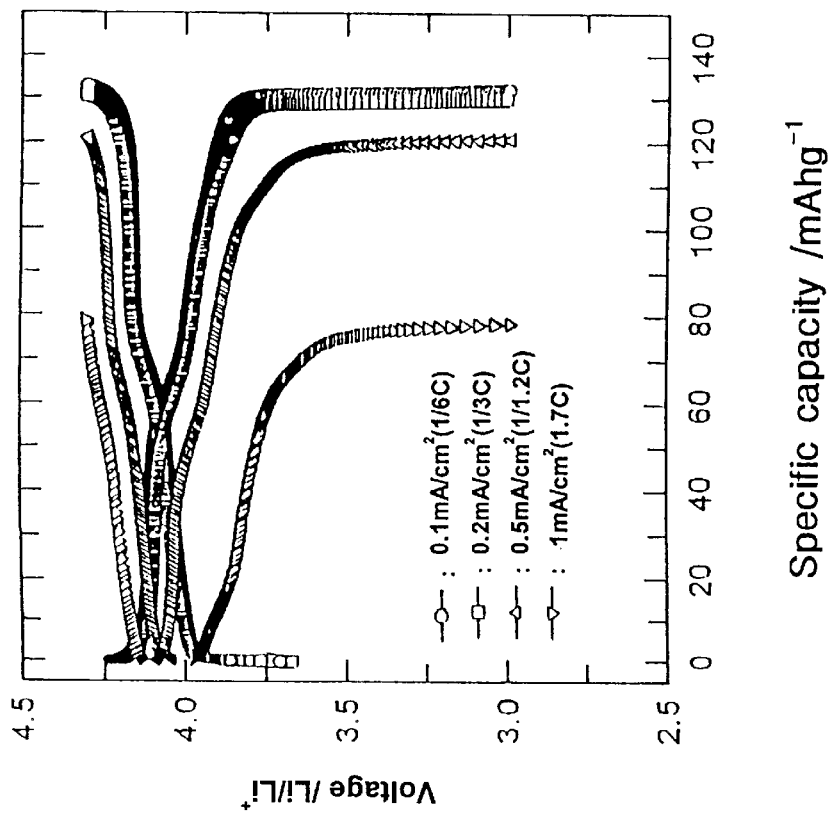
FIG. 17 illustrates a discharge capacity graph depending upon the cycles for electrolyte(PAN)$Li_{1.03}Mn_2O_4$ battery to various charge/discharge current density in Example 2.

The Ketjen black EC (conductive material, specific surface area) and Teflon (binder) of 20 wt % and 8 wt %, respectively were added to the above prepared $Li_{1.03}Mn_2O_4$, cathode active material, to fabricate the cathode composite. The Teflon binder was dissolved in water, thereafter, the cathode active material and the conductive material powder were added and mixed to form a paste, and then the paste was coated onto 316 stainless steel ex-met, and which was dried in a vacuum. 1M of the solution of EC (ethylene carbonate) and DEC (diethyl carbonate) mixed in 1:1 of the molar ratio, wherein $LiBF_4$ was dissolved, was used for the electrolyte. EC and DEC used as a solvent were pre-treated at 350° C. for 2 hours to make a molecular sieve of 4 Å, so that the content of moisture can be minimized. A lithium metal foil, the purity of 99.999%, was used for the reference and counter electrodes. The charge/discharge test depending upon cycles was carried out at the voltage limit of 3.6~4.3 V at current density of 1 mA/cm². FIG. 14 shows the discharge capacity of Li/1M $LiBF_4$—EC/DEC solution/$Li_{1.03}Mn_2O_4$ battery using $Li_{1.03}Mn_2O_4$ powder prepared by heat-treating the gel precursor at 760° C. for 24 hours, wherein the gel precursor was prepared with the molar ratios of glycolic acid to total metal ions of 0.75 and 1.5, according to cycle numbers at the cut-off voltage of 3.6~4.3 V at charge/discharge current density of 1 mA/cm². In case of preparing the sample with 1.5 of the molar ratio of glycolic acid to total metal ions, the initial discharge capacity was 128 mAh/g, and the discharge capacity was gradually decreased depending upon the cycle numbers. The discharge capacity at the 100th cycle was 120 mAh/g, and also a decrease of capacity was not shown from the 86th cycle. In case of preparing the sample with 0.75 of the molar ratio of glycolic acid to total metal ions, the initial discharge capacity was 120 mAh/g, and the discharge capacity at the 100th cycle was 107 mAh/g. The decrease rate of the capacity of the 100th cycle of the sample prepared with 0.75 and 1.5 of the molar ratio of glycolic acid to total metal ions was 12% and 6%, respectively, which showed an excellent property of capacity preservation. In order to prepare the composite cathode, an $Li_{1.03}Mn_2O_4$ of 59.5% by weight which was heat-treated at 760° C. for 24 hours, a solid polymer electrolyte (PAN:0.4 g, 1M $LiClO_4$:0.4 g, ethylene carbonate/propylene carbonate:1.65 g) of 31.2 wt %, and an acetylene black of 9.3 wt % were added and mixed. A slurry was formed, and then the slurry was coated onto aluminium foil, and which was dried. A lithium polymer cell was prepared by sandwiching PAN which was a solid polymer electrolyte between the prepared composite cathode and the lithium electrode coated onto copper. The counter electrode was prepared by using an lithium metal of 99.999% purity. The charge/discharge test depending upon cycling was carried out at current density of 0.1 mA/cm², and the current density change was carried out at constant current of 0.1~4 mA/cm² and at the voltage limit of 3.0~4.3 V. The charge discharge test was carried out at room temperature. FIG. 15 illustrates the charge/discharge behavior and the discharge capacity for Li/polymer electrolyte(PAN)/$Li_{1.03}Mn_2O_4$ cell using $Li_{1.03}Mn_2O_4$ powder prepared by heat-treating the gel precursor at 760° C. for 24 hours, wherein the gel precursor was prepared with the molar ratios of glycolic acid to total metal ions of 1.0, according to cycle numbers at the cut-off voltage of 3.0~4.3 V at the charge/discharge current density of 0.1 mA/cm². Two discharge plateaues which were characteristics of Mn-spinel structure were observed from the charge/discharge curve, and a difference between a charge curve and a discharge curve of ½ illustrates polarization, and the value was 0.065 V which was not increased and kept up to the 90th cycle. The initial charge capacity of the cell was 134 mAh/g. The discharge capacity was decreased depending upon cycle numbers, and the 90th discharge capacity was 129 mAh/g which was 96% of the initial capacity. FIGS. 16 and 17 illustrate the discharge capacity depending upon charge/discharge curve and cycle numbers as varying at current density of 0.1, 0.2, 0.5 and 1 mA/cm² for Li/polymer electrolyte(PAN)/$Li_{1.03}Mn_2O_4$ cell using $Li_{1.03}Mn_2O_4$ powder prepared by heat-treating the gel precursor at 760° C. for 24 hours. The difference between a charge curve and a discharge curve of ½ which was polarization was increased depending upon an increase of current density (FIG. 16), and when current densities of 0.1 and 0.2 mA/cm² were applied, the discharge capacity up to the 10th cycle was over about 130 mAh/g, and a decrease of capacity was not occurred. When current densities of 0.5 mA/cm²(1/1.2 C) and 1 mA/cm²(1.7 C) were applied, the discharge capacities were 121 and 78 mAh/g, respectively. When current densities of 0.1 and 0.2 mA/cm² were reapplied, the initial discharge capacities were kept.

In the conventional sol-gel method, citric acid or ethylene glycol or the like was used as a chelating agent, whereas, in the present invention, glycolic acid was used as a chelating agent so that a pure phase of $Li_xMn_2O_4$ powder was prepared, and the test of a lithium secondary cell using the cathode active material according to the present invention showed excellent cell characteristics.

EXAMPLE 3

Preparation of $Li_xMn_2O_4$ Using PAA as a Chelating Agent (1) Preparation of $Li_xMn_2O_4$ Powder $Li(CH_3COOH) \cdot 2H_2O$ and $MnCH_3(COOH)_2 \cdot 4H_2O$ was dissolved in distilled water, in which the molar ratio of $Li(CH_3COOH) \cdot 2H_2O$ to $Mn(CH_3COOH)_2 \cdot 4H_2O$ was 1:2. Thereafter, each of the aqueous solutions which have the molar ratios of PAA to total metal ions of 0.5, 1.0, 1.67 and 2.0 were mixed with the above solution. The above mixed solutions were controlled to be pH of 1~5 by adding nitric acid, thereafter, PAA/metal sols were formed by heating at 80° C., and then the sols were gradually heated to produce PAA/metal gel precursors. Examples 3A–3D were classified by $m_{paa}$ as shown in Table 2.

TABLE 2

| Example | 3A | 3B | 3C | 3D |
|---------|-----|-----|------|-----|
| $m_{paa}$ | 0.5 | 1.0 | 1.67 | 2.0 |

All of Examples 3A–3D produced transparent PAA/metal gel precursors. Example 3A–3D gave $Li_xMn_2O_4$ powder which was prepared by calcining the gel precursors at 500° C. for 10 hours under air.

(2) Analysis of TG-DTA

Figure 18:
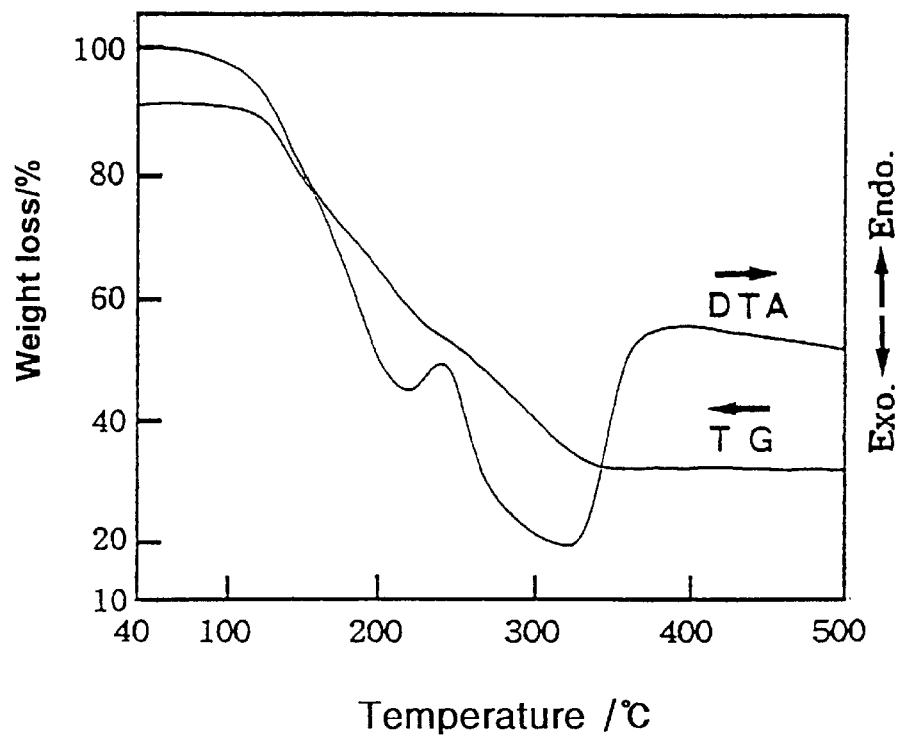
FIG. 18 is a graph of TG-DTA showing the progress from a PAA/metal gel precursor to a ceramic in Example 3.

The prepared gel precursors in Examples 3A–3D were transparent, which indicates that PAA/metal gel precursors were homogeneous. In regard to the progress from a gel precursor to a ceramic, the heat behavior of the prepared gel precursor in Example 3C was analyzed by TG-DTA, and the results were shown in FIG. 18. As shown in FIG. 18, the weight losses of the gel precursor were occurred between 60° C. and 230° C., and between 230° C. and 340° C., and the weight loss was stopped at 340° C. The weight loss between 60° C. and 230° C. was caused by decomposition of acetate in the gel precursor. The weight loss between 230° C. and 340° C. was caused by decomposition of PAA in the gel precursor. It is inferred that the results were due to severe oxidation and decomposition of the remaining organic material.

(3) Analysis of XRD Patterns

Figure 19:
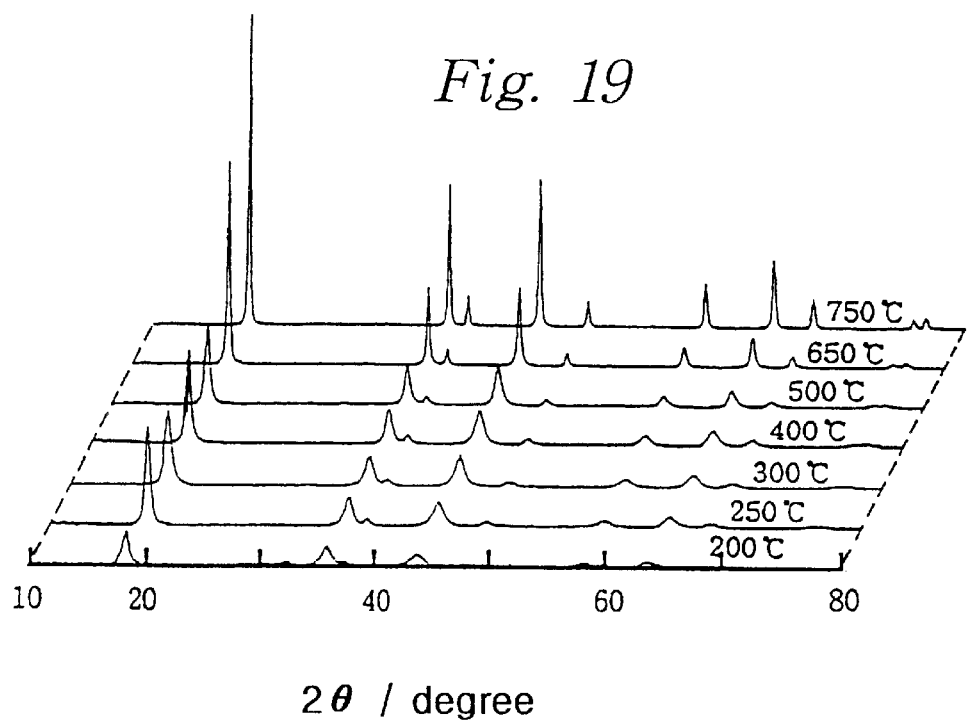
FIG. 19 is a graph showing XRD patterns of $Li_xMn_2O_4$ powder depending upon a calcination temperature of a PAA/metal gel precursor when the molar ratio of PAA to total metal ions is 1.67:1 in Example 3.
Figure 20:
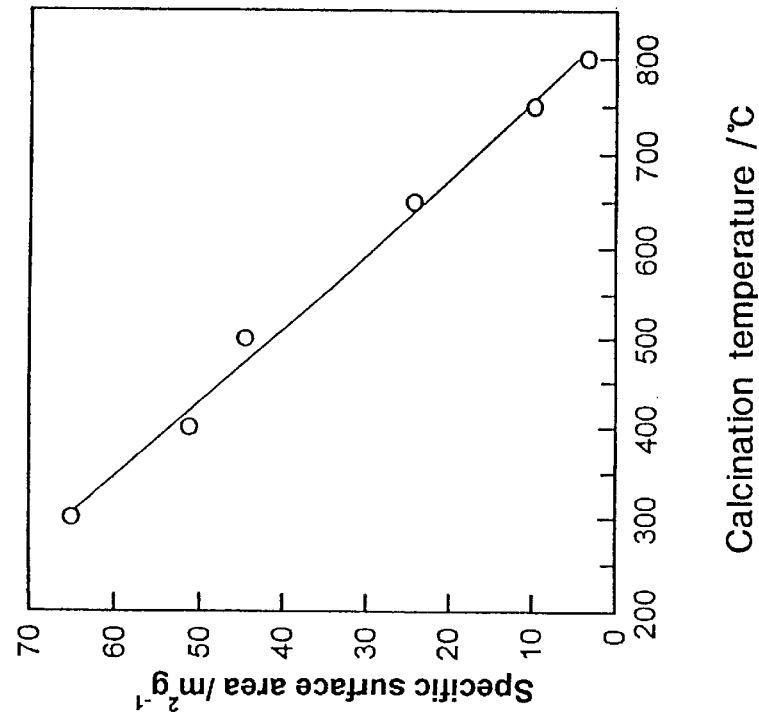
FIG. 20 is a graph showing a lattice constant [a] of $Li_xMn_2O_4$ powder depending upon a calcination temperature of a PAA/metal gel precursor when the molar ratio of PAA to total metal ions is 1.67:1 in Example 3.
Figure 21:
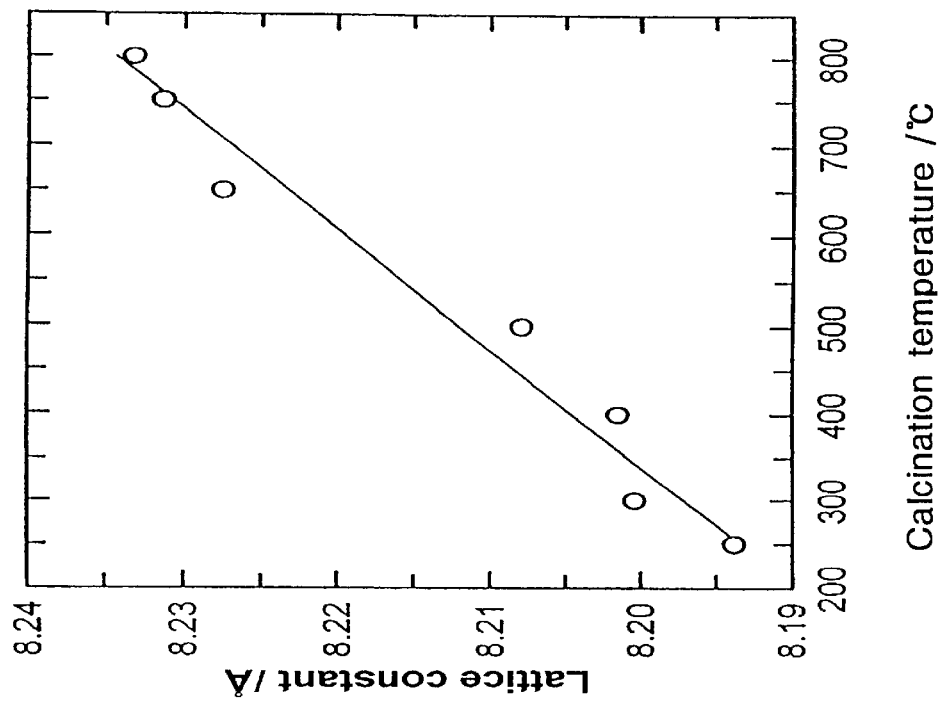
FIG. 21 is a graph showing a specific surface area of $Li_xMn_2O_4$ powder depending upon a calcination temperature of PAA/metal gel precursor when the molar ratio of PAA to total metal ions is 1.67:1 in Example 3.

FIG. 19 illustrates X-ray diffraction patterns of heat-treated sample, which was prepared in Example 3C, under air in the temperature range of 250~750° C. for 10 hours. In case of treating the sample at 200° C., impurities peaks such as $Mn_2O_3$ as well as a spinel phase of $LiMn_2O_4$ were examined. In case of treating the sample at 300° C., a spinel $LiMn_2O_4$ which has a low crystallinity and no impurity phases was observed. The more the calcination temperature was increased, the more the XRD peak was a sharp and high diffraction peak, which indicates a phase having a high crystallinity of $LiMn_2O_4$. In case of treating the sample over 650° C., the diffraction peak was suddenly increased so that a phase having a high crystallinity was produced. The result is based on the fact that in the sol-gel method using PAA as a chelating agent, the materials were initially mixed homogeneously in atomic size. FIG. 20 illustrates a cube lattice constant [a] of a spinel $LiMn_2O_4$ powder depending upon a calcination temperature. The lattice constant [a] was increased depending upon the calcination temperature, which was due to a decrease of oxidation number of Mn cation. In a low temperature, since $Mn^{4+}$ was more stable than $Mn^{3+}$, a spinel lattice constant [a] was decreased. As lowering the lattice constant [a], a high discharge capacity and a good property were showed. In the sample prepared in Example 3C, x was 1, and when the temperature was decreased with the rate of 60° C./hr, the lattice constants [a] were 8.2313 Å and 8.2332 Å at 750° C. and 800° C., respectively. FIG. 21 illustrates a specific surface area according to the calcination temperature of $Li_xMn_2O_4$ powder of Example 3C. As increasing the calcination temperature, the specific surface area of the sample was linearly decreased, which was due to the crystal growth caused by the calcination. The specific surface area of the sample synthesized at 300° C. and 800° C. in the present invention was 65 $m^2$/g and 3.3 $m^2$/g, respectively, and in case of preparing the sample at 800° C., the specific surface area was similar to a conventional product of $LiMn_2O_4$ having the specific surface area of 3 $m^2$/g.

Figure 22:
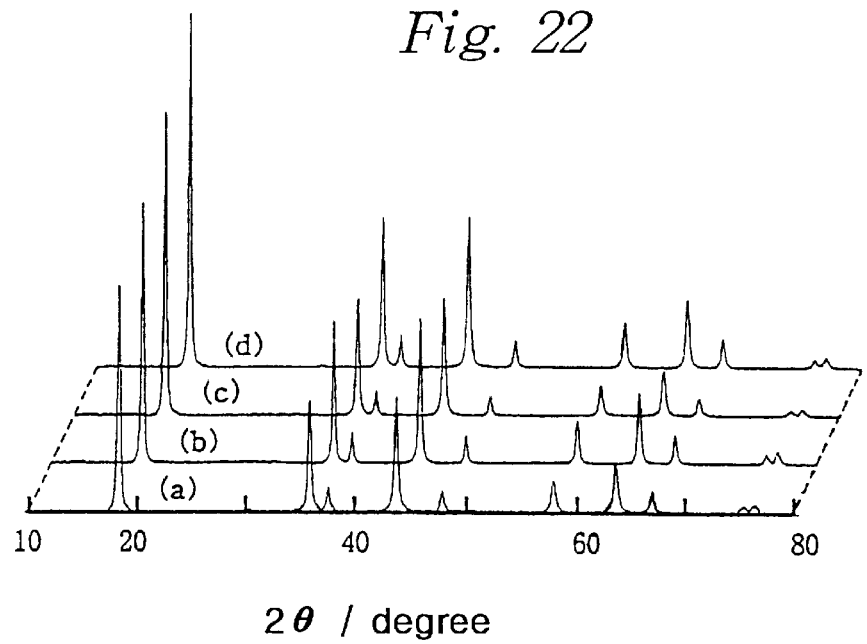
FIG. 22 is a graph showing XRD patterns of $Li_xMn_2O_4$ powder prepared by calcining a gel precursor at 650° C. when the molar ratios of PAA to total metal ions are (a) 0.5, (b) 1.0, (c) 1.67 and (d) 2.0 respectively in Example 3.
Figure 23:
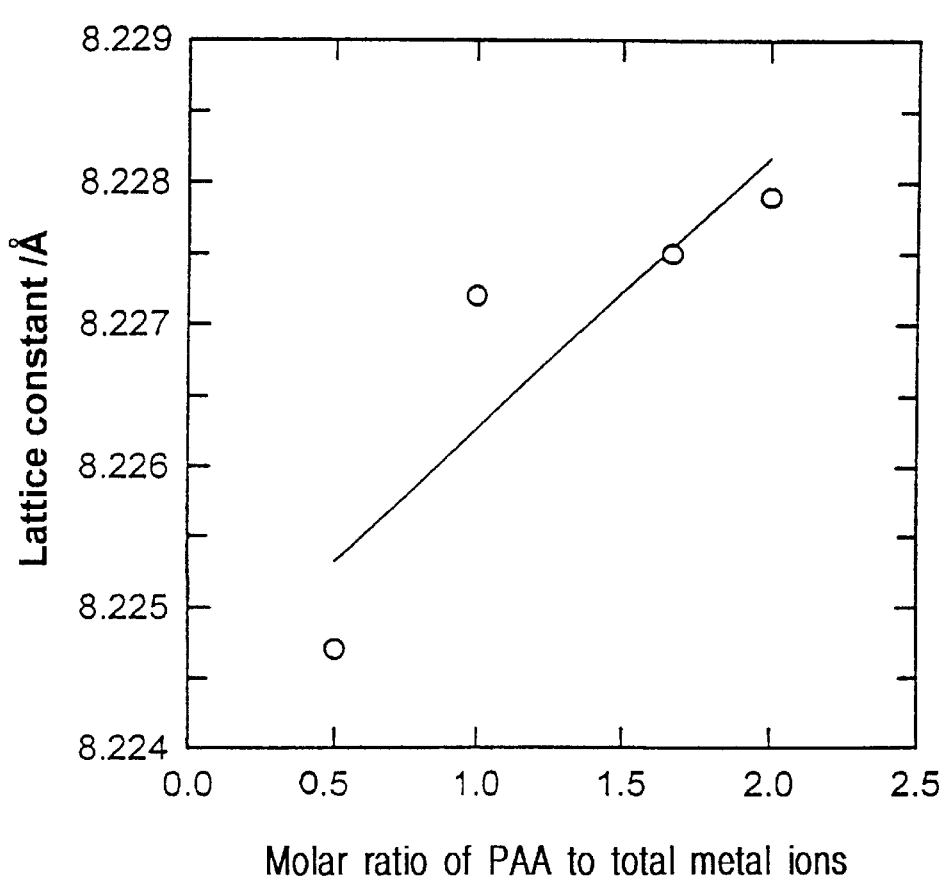
FIG. 23 is a graph showing the relationship between a lattice constant [a] and the molar ratio of PAA to total metal ions for $Li_xMn_2O_4$ powder prepared by calcining a gel precursor at 650° C. in Example 3.
Figure 24:
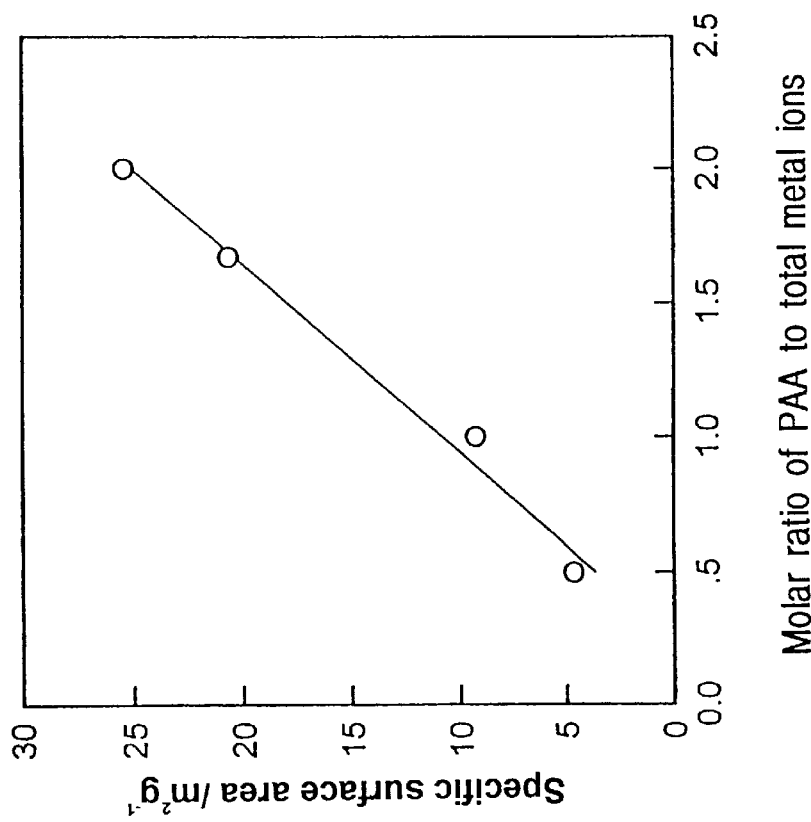
FIG. 24 is a graph showing the relationship between a specific surface area and the molar ratio of PAA to total metal ions for $Li_xMn_2O_4$ powder prepared by calcining a gel precursor at 650° C. in Example 3.

FIG. 22 illustrates XRD patterns of the gel precursor according to the molar ratio of PAA/metal in Example 3A–3D, in which the gel precursor was calcined at 650° C. for 10 hours under air. It was confirmed that the prepared sample have a cubic spinel structure having a space group of Fd3m regardless of the molar ratio of PAA to total metal ions, and as increasing the amount of PAA, the peak intensities were increased so that the crystallinity of the sample was increased. The Rietveld refinement was carried out to calculate the lattice constants [a]. The results were shown in FIG. 23. As increasing the amount of PAA, the lattice constant [a] was linearly increased. FIG. 24 illustrates the specific surface area dependence according to the amount of PAA in $LiMn_2O_4$ powder. As increasing the amount of PAA, the specific surface area of the sample was linearly increased, and the specific surface areas of the samples in Example 3A and 3D, in which $m_{paa}$ were 0.5 and 2.0, were 25.4 $m^2$/g and 4.8 $m^2$/g, respectively.

(4) Particle Size

The SEM photograph of a powder which was prepared by calcining a gel precursor at 300° C., 500° C., 750° C. and 800° C. for 10 hours under air, wherein the molar ratio of PAA to total metal ions was 1.67:1. The powder calcined at 300° C. was composed of aggregated homogeneous sphere particles, and the average radius was 30 nm. If the calcination temperature was increased, the growth of crystallinity of the powder would be increased so that the aggregated particles was grown up one big particle. There was no difference between the powder calcined at 500° C. and the powder calcined at 300° C. The powder heat-treated at 750° C. had a particle size of 100 nm and showed a homogeneous particle size distribution. In case of heat-treated powder at 800° C., the average radius was grown up to 600 nm, and the particle size distribution was very homogeneous. In order to examine a surface structure of the sample according to the amount of PAA, the SEM photograph of the gel precursor prepared at 650° C. for 10 hours under air in Example 3A and 3C was examined. The particle sizes of the prepared powder in Example 3A and 3C were 200 nm and 50 nm, respectively. The particle size of the sample prepared in Example 3A was four times as big as that of the sample prepared in Example 3C. The particle size could be controlled by changing the amount of PAA at the same calcination temperature, and the particle size distribution and the particle size could be controlled by changing the calcination temperature at the same amount of PAA.

(5) Preparation of Cathode Composite

Figure 25:
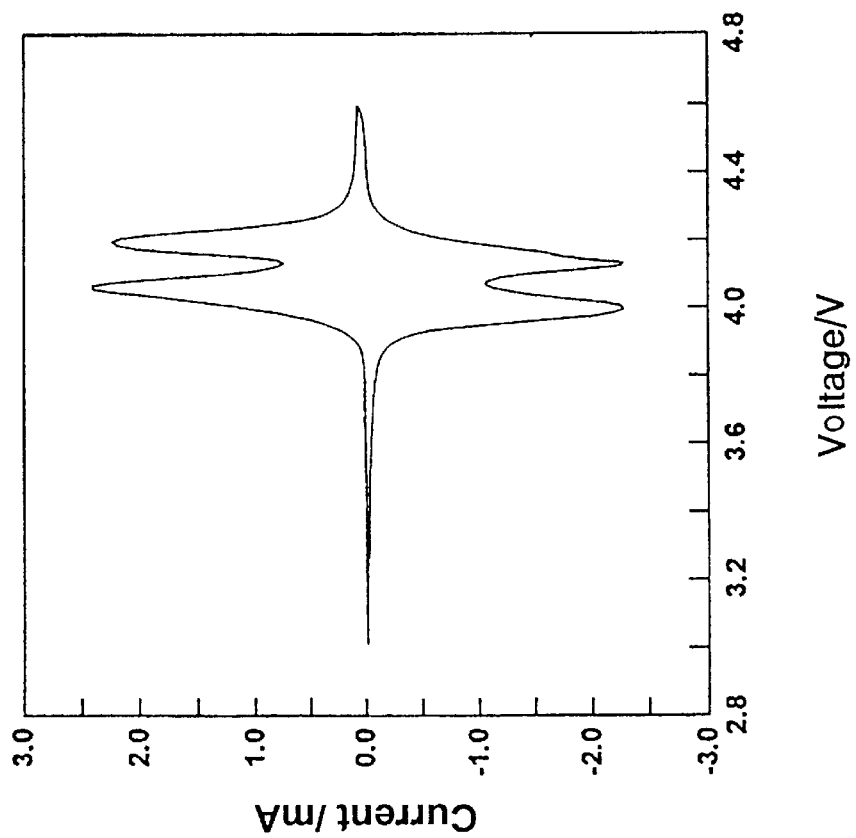
FIG. 25 is a graph showing the circulation voltage/current as scanning 0.1 mV/sec on $Li_xMn_2O_4$ electrode prepared by calcining a gel precursor at 750° C. in Example 3.
Figure 26:
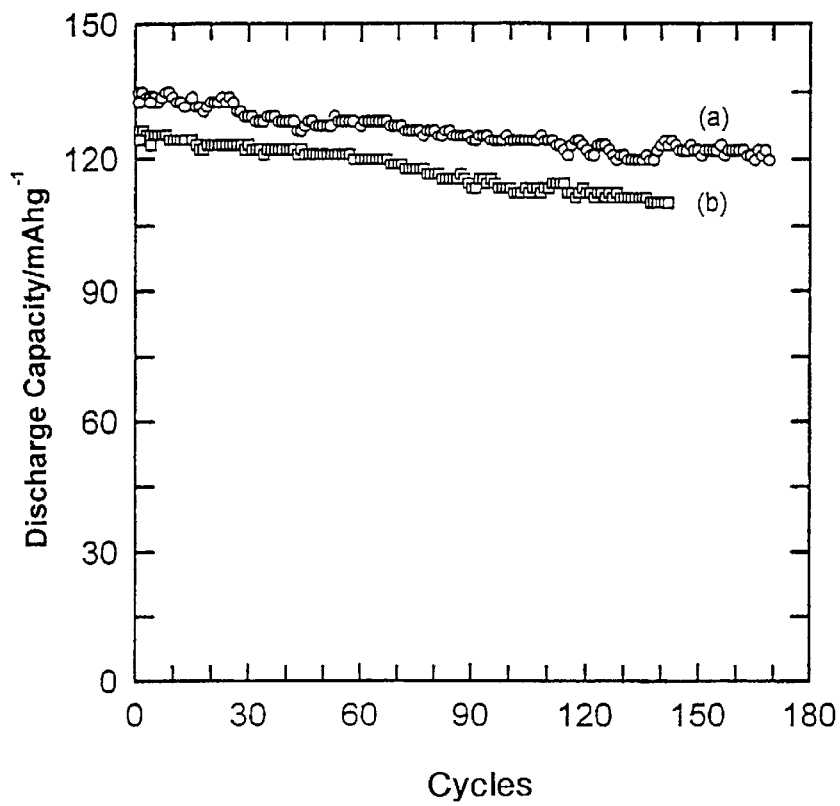
FIG. 26 is a graph showing (a) charge/discharge and (b) discharge capacity depending upon the cycle at 1 mA/cm$^2$ and at the voltage limit of 3.6V to 4.3V for Li/1M LiBF$_4$-EC/DEC solution/Li$_x$Mn$_2$O$_4$ battery using Li$_x$Mn$_2$O$_4$ powder calcined at 760° C. and 800° C. in Example 3.

The Ketjen black EC powder as a conductive material of 20% by weight and Teflon as a binder of 8% by weight were added to the $LiMn_2O_4$ prepared in Example 3B, a cathode active material, to fabricate the cathode composite. The Teflon binder was dissolved in water, thereafter, the cathode active material and the conductive material powder were added and mixed to form a paste, and then the paste was coated onto 316 stainless steel ex-met, and which was dried in a vacuum. 1M of the solution of EC (ethylene carbonate) and DEC (dimethyl carbonate) mixed in 1:1 of the molar ratio, wherein $LiBF_4$ was dissolved, was used for the electrolyte. A lithium metal foil having 99.999% purity, was used for the reference and counter electrodes. FIG. 25 illustrates the cyclic voltamogram of the 5th cycle scanned in 0.1 mV/sec in Li/1M $LiBF_4$—EC/DEC/$LiMn_2O_4$ battery using $LiMn_2O_4$ powder prepared by heat-treating the gel precursor prepared in Example 3B at 750° C. for 24 hours. Two pairs of oxidation/reduction peaks were examined at 399 V, 4.13 V and 4.06 V, 4.20 V, respectively. The height ratio ($1_{pc}/1_{pa}$) of oxidation peak and reduction peak was about 1, and the voltage difference between oxidation peak and reduction peak was 60 mV. And also, the area of oxidation peak was almost the same as that of reduction peak. The reason is based on the fact that in a sol-gel method using PAA as a chelating agent, the materials were mixed uniformly so that the activation energy needed to a spinel structure formation was low, which improves the calcination property. FIG. 26 illustrates the discharge capacity of Li/1M $LiBF_4$—EC/DEC/$LiMn_2O_4$ cell using $LiMn_2O_4$ powder prepared by heat-treating the gel precursor prepared in Example 3B at 750° C. and 800° C. for 24 hours according to cycles at the cut-off voltage of 3.6~4.3 V at the charge/discharge current density of 1 mA/$cm^2$. In case of the sample calcined at 800° C., the initial discharge capacity was 135 mAh/g, and decreased gradually depending upon cycles. The discharge capacity at the 168th cycle was 126 mAh/g. The decrease rates of the discharge capacity of the sample calcined at 800° C. and 750° C. were 0.077 and 0.114 mAhg$^{-1}$/cycle, respectively, which were an excellent discharge characteristics. Especially, the discharge property of the sample calcined at 800° C. was excellent, which was due to the formation of a homogeneous particle size distribution, a high crystallinity and a pure spinel phase.

EXAMPLE 4

Preparation of $Li_xMn_2O_4$ Using GC as a Chelating Agent (1) Preparation of $Li_xMn_2O_4$ Powder $Li(CH_3COOH).2H_2O$ and $Mn(CH_3COOH)_2.4H_2O$ was dissolved in distilled water, in which the molar ratio of $Li(CH_3COOH).2H_2O$ to $Mn(CH_3COOH)_2.4H_2O$ was 1~1.1:1. Thereafter, the aqueous solution which has the molar ratio of 1.0, 1.5, 2.0 and 2.5 of glycine to total metal ions was mixed with the above solution. The above mixed solution was controlled to be pH of 2 to 11. Thereafter, the solution was heated to form a sol at 70~90° C., and then the sol was gradually heated to form a gel precursor. A synthesis of a transparent gel precursor was possible in the all ranges of the molar ratios of glycine to total metal ions, which were carried out in this Example. The gel precursor was calcined in the temperature range of 250~800° C. for 5~30 hours under inert gas and air, and then $LiMn_2O_4$ powder was obtained.

(2) Analysis of TG

Figure 27:
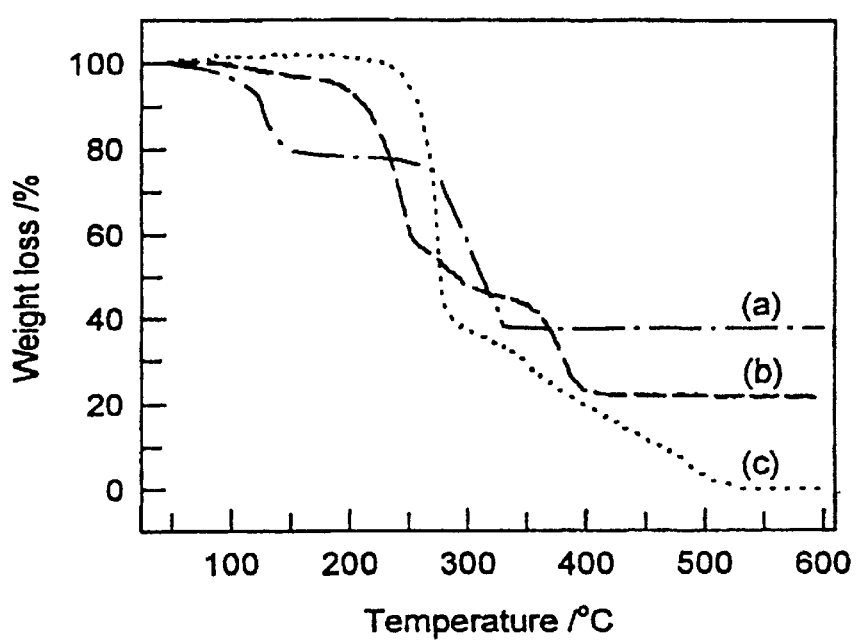
FIG. 27 is a graph of TG showing the progress from (a) a glycine, (b) an acetate mixed with Li:Mn=1:2 and (c) a gel precursor to a ceramic in Example 4.

The gel precursors prepared in the above were transparent, which indicates that gel precursors were homogeneous. To examine the progress from a gel precursor to a ceramic, the glycine, the mixture of Li acetate and Mn acetate, and the gel precursor dried in a vacuum at 80° C. were analyzed by TG. The results were shown in FIG. 27, wherein the molar ratio of glycine to total metal ions was 1.0. The weight loss of glycine was suddenly decreased up to 285° C., thereafter, the weight loss between 295° C. and 478° C. was gradually decreased due to the decomposition of the remaining organic material, and the weight loss was terminated at 530° C. The weight loss of the mixture of Li acetate and Mn acetate was occurred between 23° C. and 145° C. due to the evaporation of water. The decomposition of acetate was occurred between 275° C. and 330° C., and the weight loss was stopped at 330° C. The weight losses of the gel precursor were occurred in three sections at 180~250° C., 250~360° C. and 360~400° C. The weight loss between 180° C. and 250° C. was caused by decomposition of glycine in the gel precursor. The weight loss between 250° C. and 360° C. was caused by decomposition of acetate in the gel precursor, which was consistent with the weight loss of metal acetate mixture. The weight loss between 360° C. and 400° C. was caused by decomposition of the remaining organic material.

(3) Analysis of XRD Patterns

Figure 28:
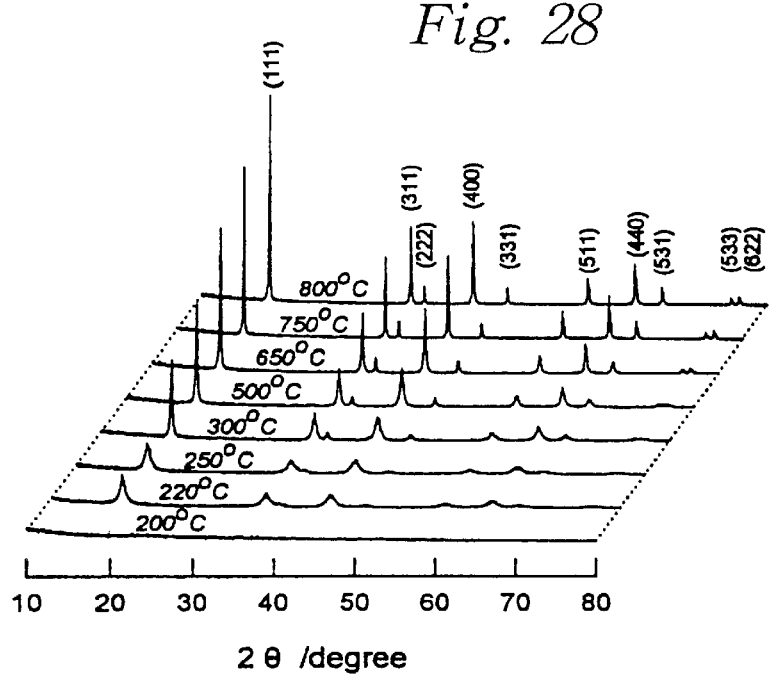
FIG. 28 is a graph showing XRD patterns of Li$_x$Mn$_2$O$_4$ powder depending upon a calcination temperature for a gel precursor when the molar ratio of glycine to total metal ions is 1.0:1 in Example 4.
Figure 29:
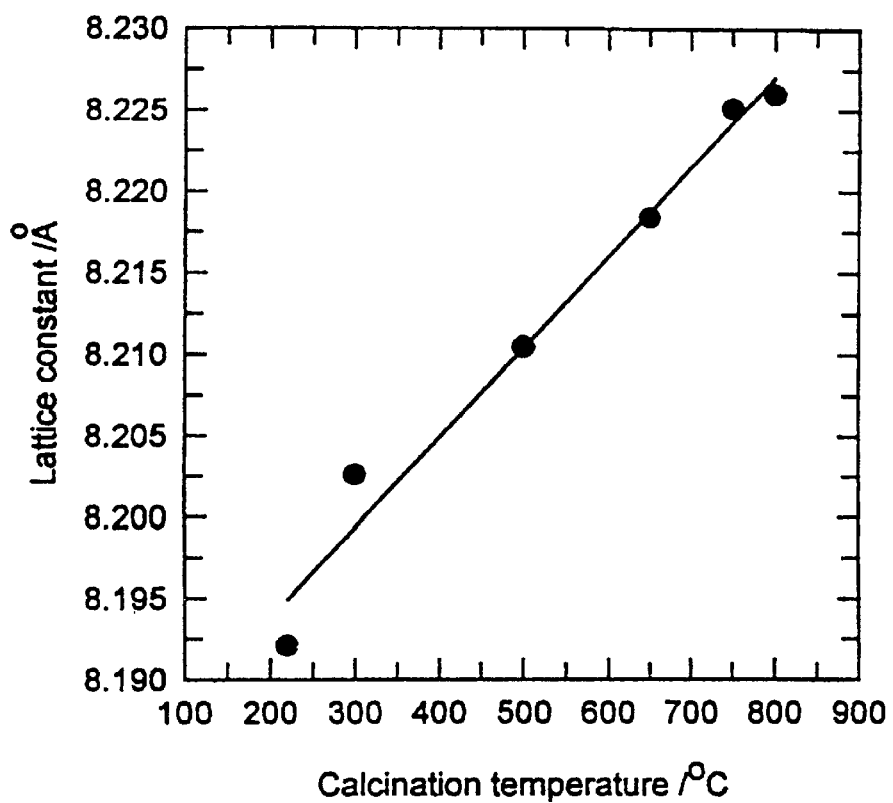
FIG. 29 is a graph showing the lattice constant [a] dependence of Li$_x$Mn$_2$O$_4$ powder depending upon a calcination temperature for a gel precursor when the molar ratio of glycine to total metal ions is 1.0:1 in Example 4.
Figure 30:
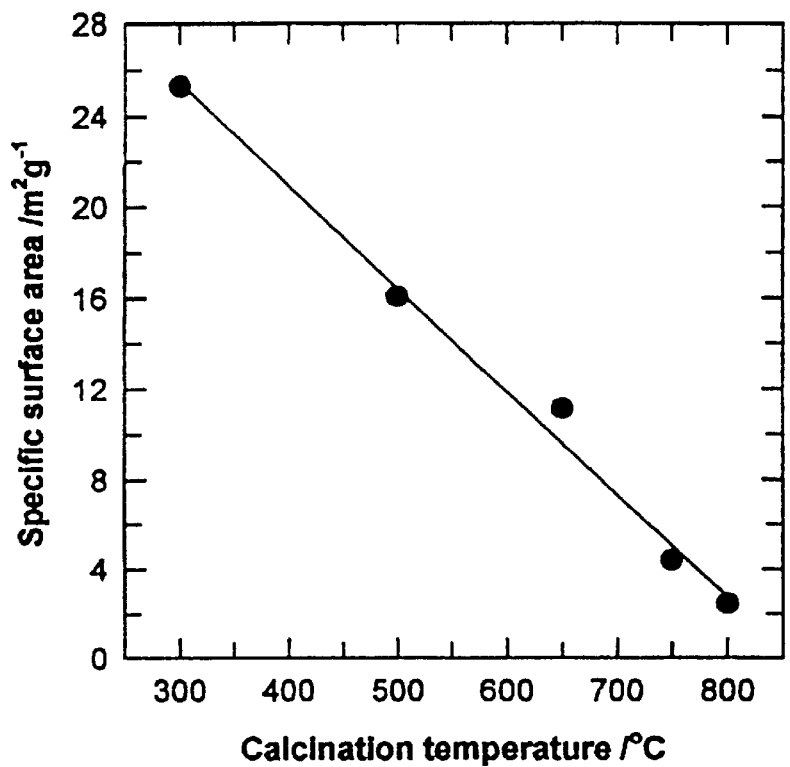
FIG. 30 is a graph showing the specific surface area dependence of Li$_x$Mn$_2$O$_4$ powder depending upon a calcination temperature for a gel precursor when the molar ratio of glycine to total metal ions is 1.0:1 in Example 4.

FIG. 28 illustrates X-ray diffraction patterns of heat-treated sample, which was prepared by calcining the gel precursor, in which the molar ratio of glycine to total metal ions was 1.0, in the temperature range of 200~800° C. for 5 hours under air. In case of calcining the sample at 200° C., an amorphous phase was observed, and in case of calcining the sample at 220° C., a spinel $Li_xMn_2O_4$ having a low crystallinity was observed. The more the calcination temperature was increased, the more the XRD peak was a sharp and high diffraction peak, which indicates a phase having a high crystallinity of $LiMn_2O_4$. In case of heat-treating the sample over 650° C., the diffraction peak was suddenly increased so that a phase having a high crystallinity was produced. The results show that a sol-gel method according to the present invention needs lower calcination temperature and shorter preparation time than the solid-state reaction method carried out in the temperature range of 650° C.~850° C. for 75~200 hours. FIG. 29 illustrates a lattice constant [a] of cubic spinel $Li_xMn_2O_4$ powder according to the calcination temperature. The lattice constant [a] was increased according to the calcination temperature, since $Mn^{4+}$ was stable at a low temperature. And since $Mn^{4+}$ existed more than $Mn^{3+}$, the lattice constant [a] was decreased. The heat-treatment of the sample prepared in Example 4 was cooled with the rate of 30° C./hr. The lattice constants [a] at the calcination temperature of 750° C. and 800° C. were 8.2251 Å and 8.2260 Å, respectively. In FIG. 30, the specific surface area of the sample was linearly decreased according to an increase of the calcination temperature, which was due to the crystal growth caused by the calcination. The specific surface areas of the sample synthesized at 300° C. and 800° C. were 25.3 m$^2$/g and 2.5 m$^2$/g, respectively, which were similar to 3 m$^2$/g of the specific surface area of a conventional product of $Li_xMn_2O_4$.

Figure 31:
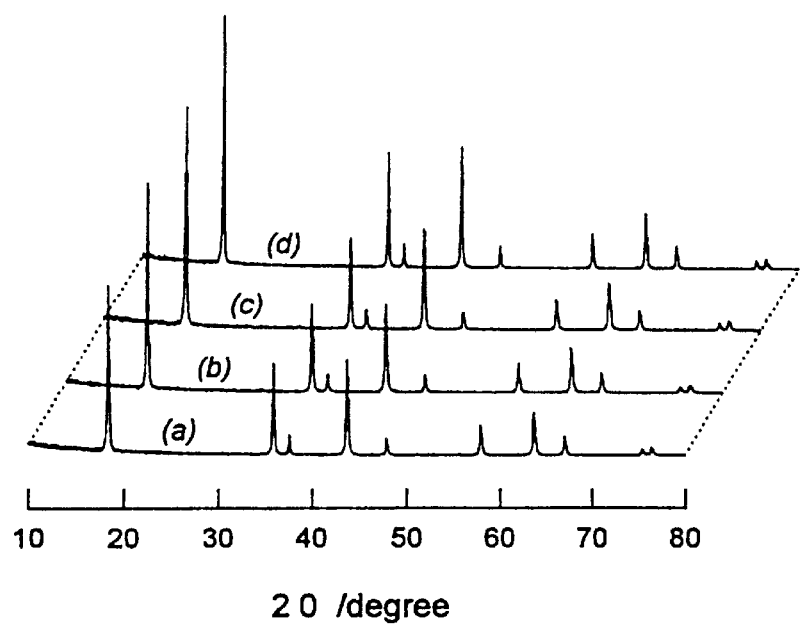
FIG. 31 is a graph showing XDR patterns of Li$_x$Mn$_2$O$_4$ powder calcined at 800° C. when the molar ratios of glycine to total metal ions are (a) 1.0, (b) 1.5, (c) 2.0 and (d) 2.5 respectively in Example 4.
Figure 32:
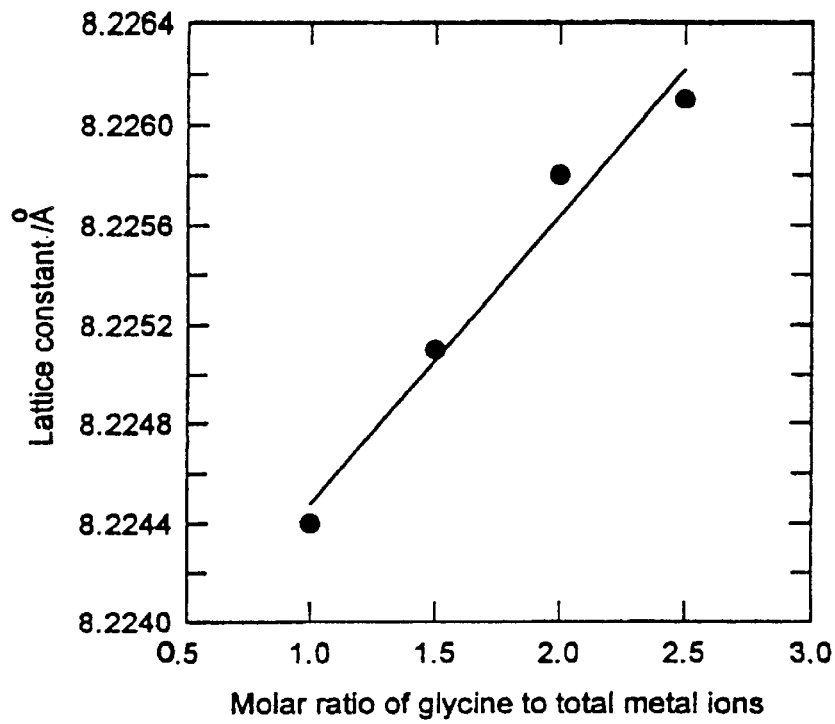
FIG. 32 is a graph showing the relationship between a lattice constant [a] and the molar ratio of glycine to total metal ions for Li$_x$Mn$_2$O$_4$ powder calcined at 800° C. in Example 4.
Figure 33A:
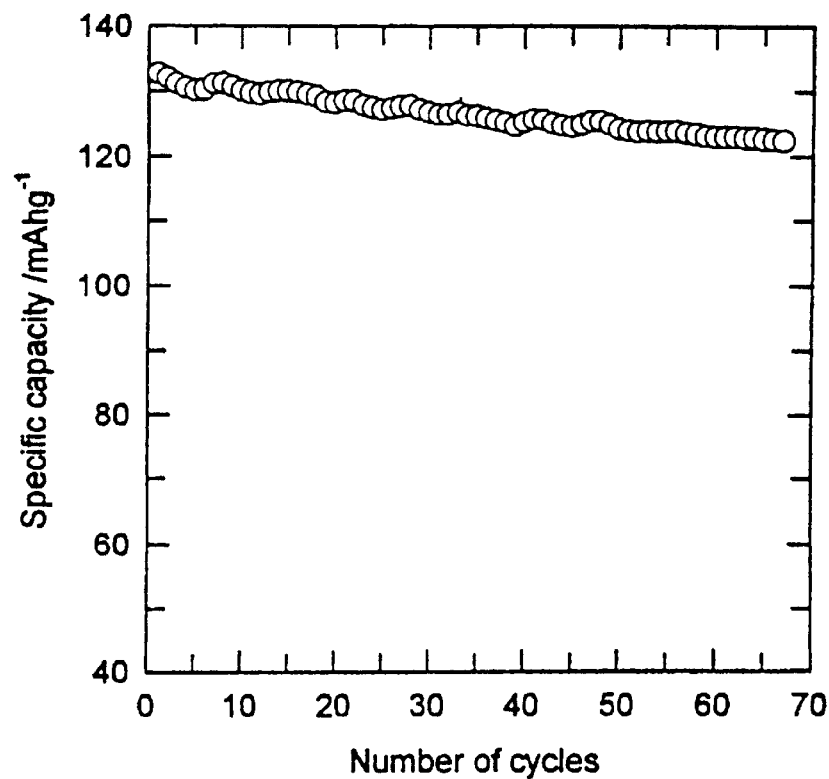
FIG. 33 is a graph showing the discharge capacity depending upon the cycle at the voltage limit of 3.6V to 4.3V and at current density of 1 mA/cm$^2$ for Li/1M LiBF$_4$-EC/DEC solution/Li$_x$Mn$_2$O$_4$ battery using Li$_x$Mn$_2$O$_4$ powder prepared by calcining a gel precursor at (a) 300° C., (b) 500° C., (c) 750° C. and (d) 800° C. when the molar ratio of total metal ions to glycine is 1.0:1 in Example 4.
Figure 33B:
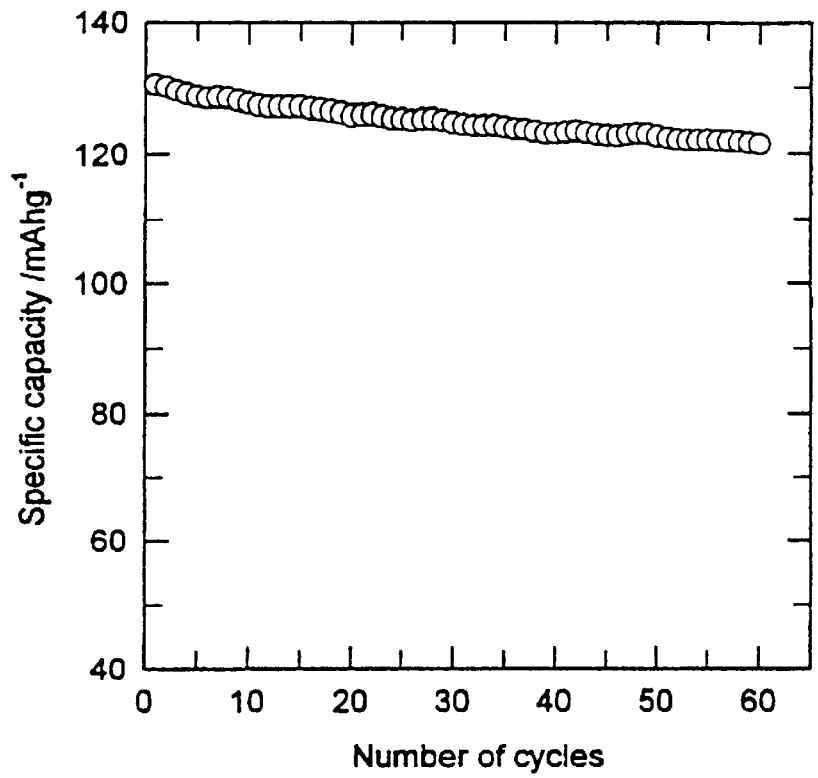
Figure 33C:
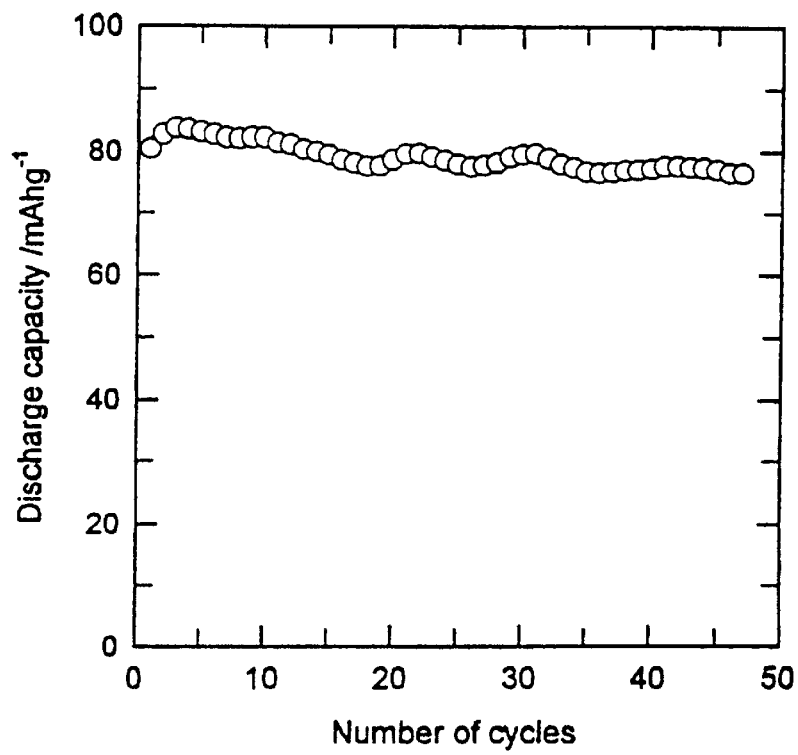
Figure 33D:
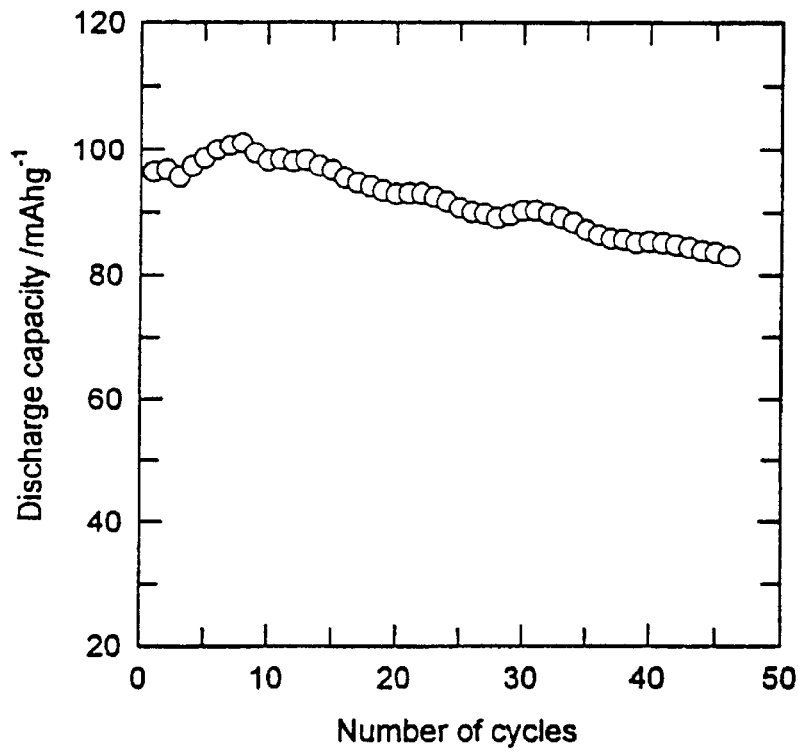

FIG. 31 illustrates XRD patterns of the sample according to the change of the molar ratio of glycine to total metal ions of the gel precursor, wherein the changes of the molar ratio of glycine to total metal ions were 1.0, 1.5, 2.0 and 2.5, and the gel precursor was calcined at 700° C. for 5 hours. It was confirmed that the prepared sample have a cubic spinel structure having a space group of Fd3m regardless of the molar ratio of glycine to total metal ions. The Rietveld refinement was carried out to calculate the lattice constants [a]. The results are shown in FIG. 32. As increasing the amount of glycine, the lattice constant [a] was linearly increased.

(4) Particle Size

The SEM photograph of a powder which was prepared by calcining a gel precursor at 300° C., 650° C., 750° C. and 800° C. for 5 hours under air, wherein the molar ratio of glycine to total metal ions was 1.0. The powder calcined at 300° C. was composed of aggregated homogeneous sphere particles, and the average radius was 60 nm. If the calcination temperature was increased, the growth of crystallinity of the powder would be increased so that the aggregated particles was grown up one big particle, and in case of the powder calcined at 650° C. and 750° C., the particle sizes were 0.1 µm and 0.2 µm, respectively. The average radius of the powder particle heat-treated at 800° C. was 0.8 µm, and the particle distribution was homogeneous. The SEM photograph of the powder, prepared by calcining the gel precursor with the molar ratios of glycine to total metal ions of 1.0 and 2.5 at 700° C. for 5 hours under air, was examined. The particle sizes of the powder prepared with the molar ratios of glycine to total metal ions of 1.0 and 2.5 were 212 nm and 130 nm, respectively. The particle size, crystallinity, specific surface area and microstructure could be controlled by changing the calcination temperature and the amount of glycine.

(5) Preparation of Lithium Ion Battery and Measurement of the Discharge Capacity The Ketjen black EC powder as a conductive material of 20% by weight and Teflon as a binder of 7% by weight were added to the $Li_xMn_2O_4$ powder of 73% by weight to fabricate the cathode composite. The Teflon binder was dissolved in water, thereafter the cathode active material and the conductive material powder were added and mixed to form a paste, and then the paste was coated onto 316 stainless steel ex-met, and which was dried in a vacuum. 1M of the solution of EC (ethylene carbonate) and DEC (diethyl carbonate) mixed in 1:1 of the molar ratio, wherein $LiBF_4$ was dissolved, was used for the electrolyte. A lithium metal foil having the 99.999% purity was used for the reference and counter electrodes. Li/1M LiBF$_4$—EC/DEC/LiMn$_2$O$_4$ battery was tested at the charge/discharge current density of 1 mA/cm$^2$ and at the cut-off voltage of 3.6~4.3 V, and the discharge capacity according to cycles is shown in FIG. 33, wherein the used Li$_x$Mn$_2$O$_4$ powder was prepared by heat-treating the gel precursor at 300° C., 500° C., 750° C. and 800° C. for 24 hours. The initial discharge capacity of the sample prepared at 300° C. was 80.4 mAh/g, and increased according to cycles. The discharge capacity at the 47th cycle was 76.6 mAh/g. The initial discharge capacities of the sample calcined at 500° C., 750° C. and 800° C. were 96.4, 130.5 and 132.8 mAh/g, respectively, and increased according to cycles. In case of calcining the sample at 500° C., the discharge capacity at the 46th cycle was 83.3 mAh/g, and in case of calcining the sample at 750° C., the discharge capacity at the 60th cycle was 121.5 mAh/g, and in case of calcining the sample at 800° C., the discharge capacity at the 67th cycle was 122.4 mAh/g. From the above results, as increasing the calcination temperature, the initial discharge capacity was increased, whereas the cycle characteristics was decreased.

Figure 34:
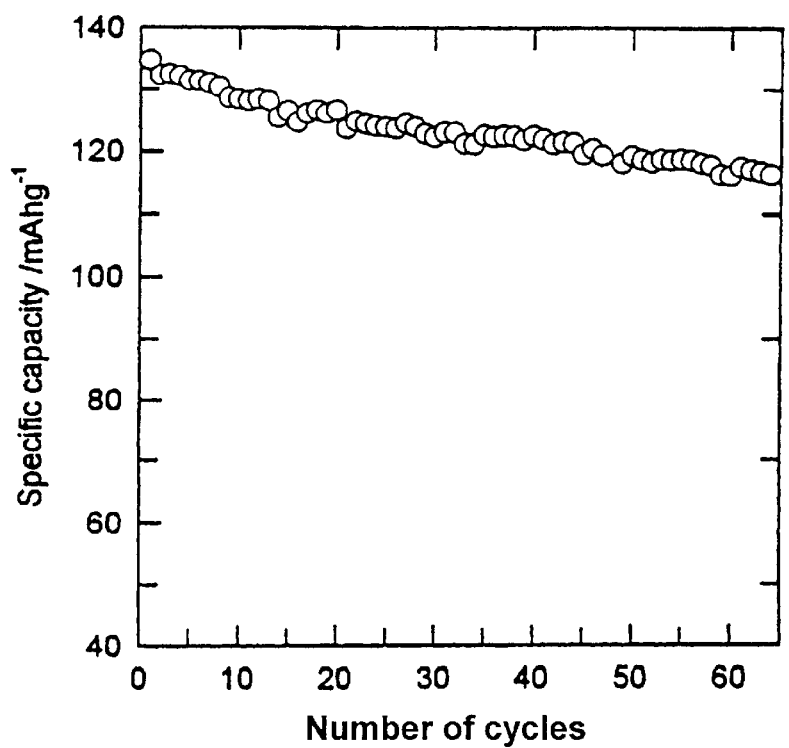
FIG. 34 is a graph showing the discharge capacity depending upon the cycle in the voltage limit of 3.0V to 4.3V and at a uniform current density of 0.1 mA/cm$^2$ for Li/polymer electrolyte/Li$_x$Mn$_2$O$_4$ battery using Li$_x$Mn$_2$O$_4$ powder prepared by a gel precursor at 800° C. in Example 4.
Figure 35:
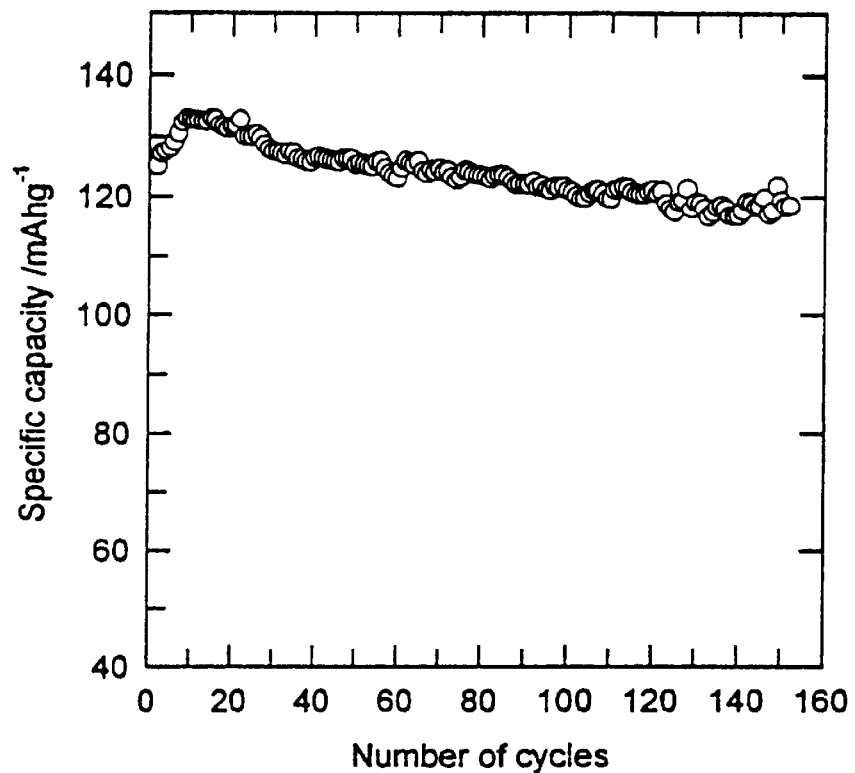
FIG. 35 is a graph showing the discharge capacity depending upon the cycle at the voltage limit of 3.0V to 4.3V and at current density of 0.1 mA/cm$^2$ for Li/polymer electrolyte(acrylonitrile-methylmethacrylate-styrene)/Li$_{1.03}$Mn$_2$O$_4$ battery using Li$_x$Mn$_2$O$_4$ powder prepared by calcining a gel precursor at 800° C. in Example 4.

(5) Preparation of Lithium Polymer Battery and Measurement of the Discharge Capacity A composite cathode for lithium polymer secondary battery was prepared by the step of adding and mixing a solid polymer electrolyte of 31.2% by weight and Acetylene Black of 9.3% by weight into Li$_x$Mn$_2$O$_4$ heat-treated at 800° C. for 24 hours, providing a slurry, coating the slurry onto an aluminium foil, and drying it. The used electrolytes were 1) PAN (0.4 g), 1M LiClO$_4$ (0.4 g), Ethylene Carbonate/Propylene Carbonate (1.65 g), and 2) acrylonitrile-methylmethacrylate-styrene (0.4 g), ethylene carbonate/propylene carbonate (1.65 g). Lithium polymer battery was prepared by sandwiching solid polymer electrolyte between a composite cathode and a lithium electrode coated onto copper foil. Lithium metal of 99.999% purity was used for the counter electrode. The cell was charged and discharged at current density of 0.1 mA/cm$^2$ in the range of 3.0 to 4.3 V. The discharge capacities of Li/solid polymer electrolyte (PAN)/Li$_x$Mn$_2$O$_4$ cell were presented in FIG. 34. The initial discharge capacity was 135 mAh/g, and the discharge capacity was gradually decreased depending upon charge/discharge numbers, and the 64th discharge capacity was 86% of the initial capacity. The discharge capacities depending upon cycle number for Li/solid polymer electrolyte (PAN)/Li$_x$Mn$_2$O$_4$ cell were graphically presented in FIG. 35. The initial discharge capacity was 125 mAh/g, and the discharge capacity was increased up to the 9th cycle, and thereafter, decreased gradually. The discharge capacity at 9th cycle was 135 mAh/g, and the discharge capacity at the 182th cycle was 119 mAh/g, which was 94.6% of the initial discharge capacity.

EXAMPLE 5

Figure 38A:
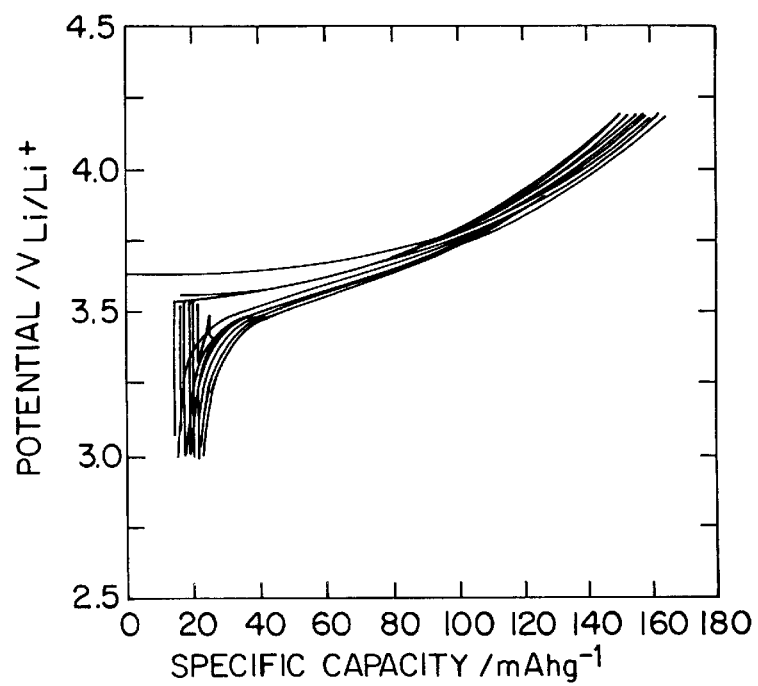
FIG. 38 illustrates (a) charge/discharge graph and (b) discharge capacity graph depending upon the cycle, carried out at the uniform current density of 0.25 mA/cm$^2$ at the voltage limit of 3.0V and 4.25V for Li/1M LiCl$_4$-EC/PC solution/LiNi$_{0.5}$Co$_{0.5}$O$_2$ battery using LiNi$_{0.5}$Co$_{0.5}$O$_2$ powder calcined at 750° C. in Example 5.
Figure 38B:
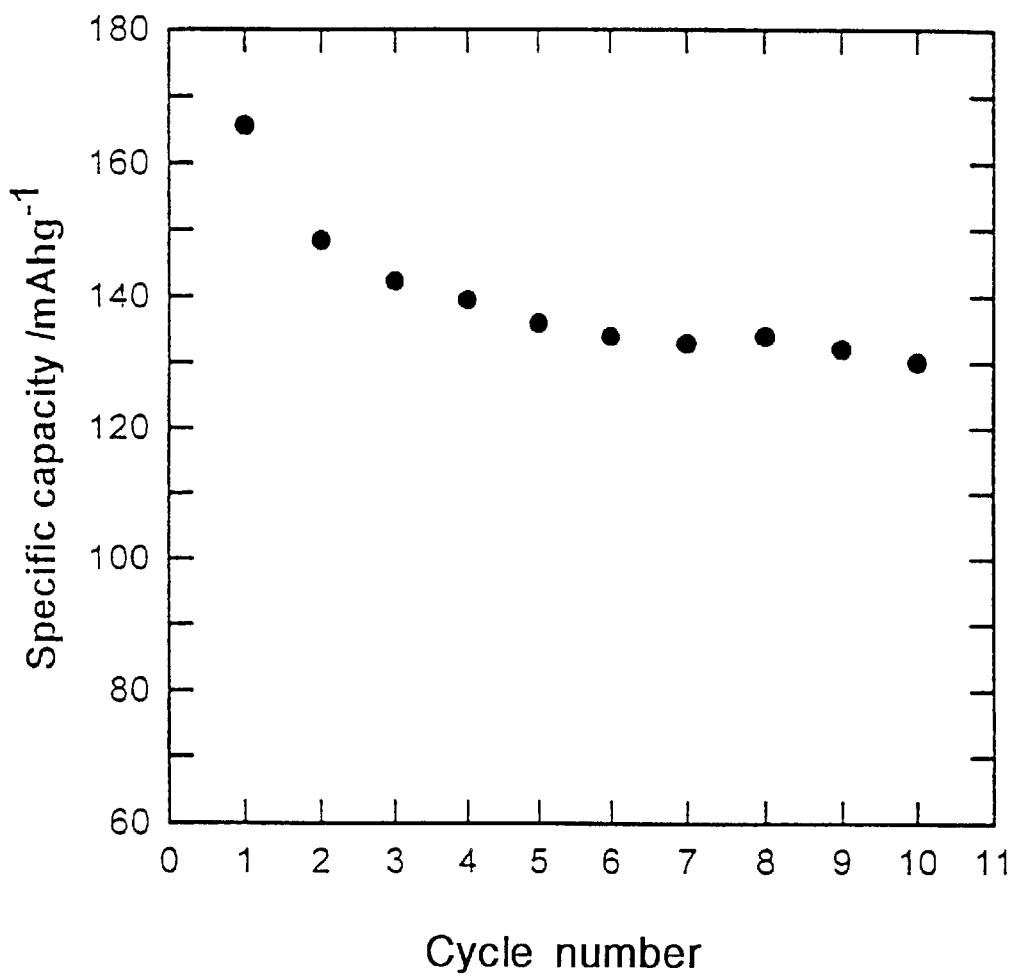

Preparation of LiNi$_{1-x}$Co$_x$O$_2$ Using PAA as a Chelating Agent (1) Preparation of LiNi$_{0.5}$Co$_{0.5}$O$_2$ powder A mixture was prepared from the molar ratio of Li-nitrate vs. Co-nitrate vs. Ni-nitrate of 1:0.5:0.5. The mixture was dissolved in distilled water, thereafter, an aqueous solution was prepared from the molar ratio of polyacrylic acid to total metal ions of 1.0, and then mixed together. The mixed solution was heated in the temperature range of 70° C. to 90° C. in a desiccator or magnetic stirrer to form a sol, and the sol was gradually heated to form a gel precursor. LiNi$_{0.5}$Co$_{0.5}$O$_2$ powder was prepared by calcining the gel precursor in the temperature range of 250° C. to 900° C. for 5 to 30 hours under air. A cathode composite was composed of LiNi$_{0.5}$Co$_{0.5}$O$_2$ powder of 85% by weight and Acetylene Black (conductive material) of 12% by weight and polyvinylidene fluoride (PVDF) (binder) of 3% by weight. The preparation method of the cathode composite comprises dissolving PVDF in NMP solution, mixing LiNi$_{0.5}$Co$_{0.5}$O$_2$ powder and a conductive material to form a slurry, coating the slurry on aluminium foil, and drying the coated surface in a vacuum. An electrolyte was prepared from the mixture with the molar ratio of ethylene carbonate (EC) vs. propylene carbonate of 1:1, in which 1M of LiClO$_4$ was dissolved therein. The charge/discharge test depending upon cycles was carried out at current density of 0.25 mA/cm$^2$ at the voltage limit of 3.0 V to 4.2 V. The discharge capacity of Li/1M LiClO$_4$—EC/DEC/LiNi$_{0.5}$Co$_{0.5}$O$_2$ cell at 0.25 mA/cm$^2$ at the voltage limits of 3.0 V to 4.2 V was presented in FIG. 38, wherein LiNi$_{0.5}$Co$_{0.5}$O$_2$ was prepared by calcining the gel precursor at 750° C. for 10 hours. The polarization which was ½ of the difference between a charge curve and a discharge curve was 0.2 V, which was constant. The initial discharge capacity was 165 mAh/g, and a discharge capacity depending upon cycles was gradually decreased, whereas the value of the polarization was constant, which was due to decomposition of the electrolyte. Accordingly, to improve the cyclability of Li/1M LiClO$_4$—EC/DEC/LiNi$_{0.5}$Co$_{0.5}$O$_2$ cell, the selection of the appropriate electrolyte wherein oxidation does not occur is required.

(2) Analysis of TG—DAT

Figure 36:
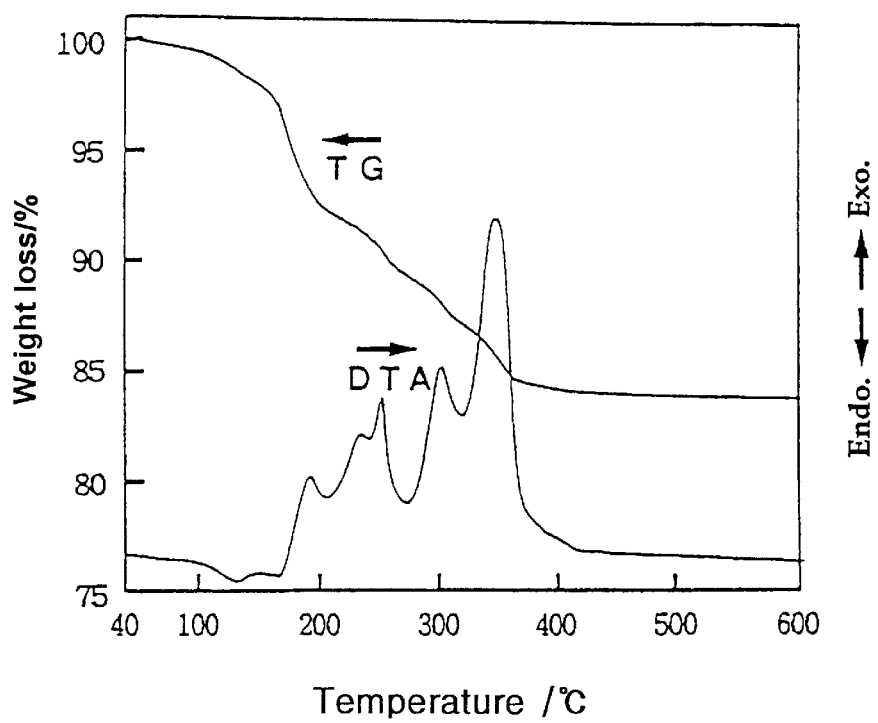
FIG. 36 is a graph of TG and DTA showing the progress from a gel precursor to a ceramic in Example 5.

The gel precursor prepared by the present invention was transparent, which indicates the homogeneity of the gel precursor. To examine the progress from a gel precursor to a ceramic, the thermal behavior was analyzed by TG—DTA. The results was graphically presented in FIG. 36. The gel precursor used in thermal behavior was dried in a vacuum at 80° C. The weight losses of the gel precursor were occurred at 40° C.~170° C., 170° C.~320° C. and 320° C.~370° C., and the weight loss was stopped at 370° C. The weight loss between 40° C. and 170° C. was caused by evaporation of water in the gel precursor, which corresponds to endothermic peak appeared at 133° C. and 170° C. of DTA curve. The weight loss between 170° C. and 320° C. was caused by decomposition of organic and inorganic material such as nitrate and PAA in the gel precursor, which corresponds to exothermic peak appeared at 192° C., 234° C., 252° C. and 300° C. of DTA curve. Specially, the exothermic peak at 234° C. was caused by decomposition of nitric acid. The weight loss between 320° C. and 370° C. was caused by decomposition of the remaining organic material in the gel precursor, which corresponds to exothermic peak at 350° C. of DTA curve.

Figure 37:
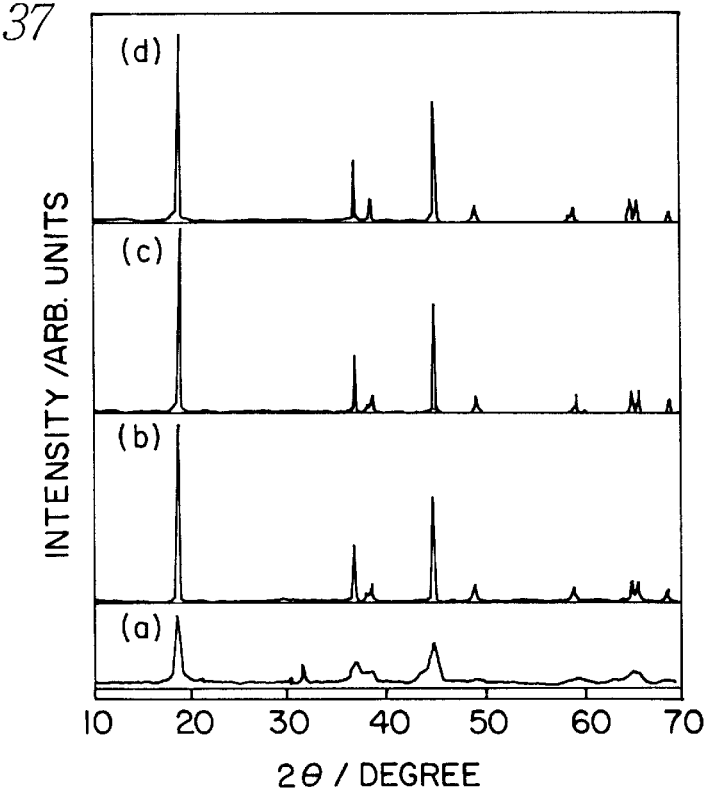
FIG. 37 is a graph XRD of LiNi$_{0.5}$Co$_{0.5}$O$_2$ powder prepared by calcining a gel precursor at (a) 500° C., (b) 600° C., (c) 700° C. and (d) 850° C. for 1 hour under atmosphere in Example 5.

FIG. 37 illustrates X-ray diffraction patterns of the sample heat-treated at 500° C., 600° C., 700° C. and 850° C. for 1 hour under air. In case of calcining the gel precursor at 500° C., impurities were observed as well as LiNi$_{0.5}$Co$_{0.5}$O$_2$ phase. In case of calcining the gel precursor at 600° C., HT—LiNi$_{0.5}$Co$_{0.5}$O$_2$, called a high temperature phase, was produced. As increasing the calcination temperature, the XRD peak was a sharp and high diffraction peak, which illustrates a high crystallinity of LiNi$_{0.5}$Co$_{0.5}$O$_2$ powder. The results illustrates that a sol-gel method according to the present invention needs lower calcination temperature and shorter preparation time than a solid-phase reaction method.

The reason is based on the facts that in a sol-gel method using polyacrylic acid as a chelating agent, the materials were initially mixed homogeneously in atomic size, and the particle size was very small. From the results examined in SEM photograph, the surface of powder calcined at 500° C. composed of aggregated homogeneous sphere particles having 40 nm of particle average size. As increasing the calcination temperature, the growth of crystallinity was increased so that the aggregated particles was grown up one big particle. In case of heat-treating the gel precursor at 750° C., the particle size was increased to 2 μm, and the particle distribution was very homogeneous.

The present invention can be easily carried out by an ordinary skilled person in the art. Many modifications and changes may be deemed to be with the scope of the present invention as defined in the following claims.

What is claimed is:

1. A method of preparing $Li_xMn_2O_4$ (x=1~1.1) powder for a cathode active material of a lithium secondary battery, which comprises:

mixing a solution of Li-salt and Mn-Salt as metal precursors and a solution of polyvinylbutyral (PVB) as a chelating agent, wherein the molar ratio of Li to Mn is in the range of 1~1.1:2 and wherein the molar ratio of the two metals to the PVB in the range of 0.1~5.0;

heating said mixed solution in the temperature range of 70° C. to 90° C. in the range of pH 1~11 to provide a PVB/metal sol;

further heating said PVB/metal sol in the temperature range of 70° C. to 90° C. to provide a PVB/metal gel; and calcining said PVB/metal gel in the temperature range of 200° C. to 900° C. for 5 to 30 hours under an inert gas or air.

2. The method as defined in claim 1 wherein said Li-salt is selected from the group consisting of Li nitrate, Li acetate, Li hydroxo-salt and Li γ-oxyhydroxide, and said Mn-salt is selected from the group consisting of Mn nitrate, Mn acetate, Mn hydroxo-salt and Mn γ-oxyhydroxide.

3. The method as defined in claim 2 wherein said Li acetate is $Li(CH_3COOH).2H_2O$ and said Mn acetate is $Mn(CH_3COOH)_2.4H_2O$.

4. A method of preparing $Li_xMn_2O_4$ (x=1~1.1) powder for a cathode active material of a lithium secondary battery, which comprises:

mixing a solution of Li-salt and Mn-salt as metal precursors and a solution of polyacrylic acid (PAA) as a chelating agent, wherein the molar ratio of Li to Mn is in the range of 1~1.1:2 and wherein the molar ratio of the two metals to the PAA is in the range of 0.1~5.0;

heating said mixed solution in the temperature range of 70° C. to 90° C. in the range of pH 1~11 to provide a PAA/metal sol;

further heating said PAA/metal sol in the temperature range of 70° C. to 90° C. to provide a PAA/metal gel; and calcining said PAA/metal gel in the temperature range of 200° C. to 900° C. for 5 to 30 hours under an inert gas or air.

5. The method as defined in claim 4 wherein said Li-salt is selected from the group consisting of Li nitrate, Li acetate, Li hydroxo-salt and Li γ-oxyhydroxide, and said Mn-salt is selected from the group consisting of Mn nitrate, Mn acetate, Mn hydroxo-salt and Mn γ-oxyhydroxide.

6. The method as defined in claim 5 wherein said Li acetate is $Li(CH_3COOH).2H_2O$ and said Mn acetate is $Mn(CH_3COOH)_2.4H_2O$.

7. A method of preparing $Li_xMn_2O_4$ (x=1~1.1) powder for a cathode active material of a lithium secondary battery, which comprises:

mixing a solution of Li-salt and Mn-salt as metal precursors and a solution of glycine (GC) as a chelating agent, wherein the molar ratio of Li to Mn is in the range of 1~1.1:2 and wherein the molar ratio of the two metals to the GC is in the range of 0.1~5.0;

heating said mixed solution in the temperature range of 70° C. to 90° C. in the range of pH 1~1.1 to provide a GC/metal sol;

further heating said GC/metal sol in the temperature range of 70° C. to 90° C. to provide a GC/metal gel; and calcining said GC/metal gel in the temperature range of 200° C. to 900° C. for 5 to 30 hours under an inert gas or air.

8. The method as defined in claim 7 wherein said Li-salt is selected from the group consisting of Li nitrate, Li acetate, Li hydroxo-salt and Li γ-oxyhydroxide, and said Mn-salt is selected from the group consisting of Mn nitrate, Mn acetate, Mn hydroxo-salt and Mn γ-oxyhydroxide.

9. The method as defined in claim 8 wherein said Li acetate is $Li(CH_3COOH).2H_2O$ and said Mn acetate is $Mn(CH_3COOH)_2.4H_2O$.

10. A method of preparing $LiNi_{1-x}Co_xO_2$ (x=0~1.0) powder for a cathode active material of a lithium secondary battery, which comprises:

mixing a solution of Li-salt, Ni-salt and Co-salt as metal precursors and a solution of polyacrylic acid (PAA) as a chelating agent, wherein the molar ratio of the total metals to the PAA is in the range of 0.1~5.0;

heating said mixed solution in the temperature range of 70° C. to 90° C. in the range of pH 1~11 to provide a PAA/metal sol;

further heating said PAA/metal sol in the temperature range of 70° C. to 90° C. to provide a PAA/metal gel; and calcining said PAA/metal gel in the temperature range of 200° C. to 900° C. for 5 to 30 hours under an inert gas or air.

11. The method as defined in claim 10 wherein said Li-salt is selected from the group consisting of Li nitrate, Li acetate, Li hydroxo-salt and Li γ-oxyhydroxide, wherein said Ni-salt is selected from the group consisting of Ni nitrate, Ni acetate, Ni hydroxo-salt and Ni γ-oxyhydroxide, and wherein said Co-salt is selected from the group consisting of Co nitrate, Co acetate, Co hydroxo-salt and Co γ-oxyhydroxide.

* * * * *